United States Patent
Kimura et al.

(12) 
(10) Patent No.: US 6,439,282 B1
(45) Date of Patent: Aug. 27, 2002

(54) WHEEL WITH A DAMPER FOR AN AUTOMOBILE AND A METHOD FOR MANUFACTURING THE SAME

(75) Inventors: Yoshiaki Kimura, Toyota; Tadashi Imamura, Atsugi, both of (JP)

(73) Assignees: Topy Kogyo Kabushiki Kaisha; Bridgestone Corporation, both of Tokyo (JP)

( * ) Notice: Subject to any disclaimer, the term of this patent is extended or adjusted under 35 U.S.C. 154(b) by 0 days.

(21) Appl. No.: 09/578,857

(22) Filed: May 26, 2000

(30) Foreign Application Priority Data

May 27, 1999 (JP) .......................... 11-148289
Jun. 16, 1999 (JP) .......................... 11-170186
Mar. 28, 2000 (JP) ....................... 2000-089084

(51) Int. Cl.[7] ................................................ B60C 5/00
(52) U.S. Cl. ....................................................... 152/158
(58) Field of Search ................................. 152/157, 158, 152/165; 295/7, 11, 12

(56) References Cited

U.S. PATENT DOCUMENTS

| 623,883 | A | * | 4/1899 | Cameron | 295/11 |
|---|---|---|---|---|---|
| 1,840,898 | A | * | 1/1932 | Gunn | 295/11 |
| 2,074,341 | A | * | 3/1937 | Piron | 295/11 |
| 2,090,179 | A | * | 8/1937 | Brownyer | 295/11 |
| 2,282,589 | A | * | 5/1942 | Mayne | 295/11 |
| 2,895,175 | A | * | 7/1959 | Reuter et al. | 295/11 |
| 2,898,142 | A | * | 8/1959 | Kordes | 295/11 |
| 2,911,252 | A | * | 11/1959 | Templeton | 295/11 |
| 2,921,811 | A | * | 1/1960 | Trevaskis | 295/11 |
| 2,954,259 | A | * | 9/1960 | Kordes | 295/11 |
| 4,549,590 | A | * | 10/1985 | Sahagian | 295/12 |
| 6,312,033 | B1 | * | 11/2001 | Engstler | 295/11 |

FOREIGN PATENT DOCUMENTS

JP         5-338401           12/1993

* cited by examiner

Primary Examiner—S. Joseph Morano
Assistant Examiner—Long Bao Nguyen
(74) Attorney, Agent, or Firm—Pillsbury Winthrop LLP

(57) ABSTRACT

A wheel with a damper for an automobile includes a rim, a disk, and a damper. The damper includes a rubber member. The rubber member includes a first portion and a second portion. The first portion performs mainly an elastic shear deflection and the second portion acts as a stopper. The first portion extends in an axial direction of the wheel and has an inside surface and an outside surface which contact a space and are not constrained. The end surfaces of the first portion extend perpendicularly to the axial direction of the wheel. A vibrational system having a spring of the first portion of the rubber member and a mass of an automobile is designed so as to have a first natural frequency in a range of 6–12 H, preferably, in a range of 8–10 Hz.

19 Claims, 25 Drawing Sheets

WHEEL WITH A DAMPER FOR AN AUTOMOBILE AND A METHOD FOR MANUFACTURING THE SAME

The present application is based on and claims priority from Japanese Patent Application Nos. HEI 11-148289 filed on May 27, 1999, HEI 11-170186 filed on Jun. 16, 1999, and 2000-89084 filed on Mar. 28, 2000, the contents of which are incorporated herein by reference.

BACKGROUND OF THE INVENTION

1. Field of the Invention

The present invention relates to a wheel with a damper for an automobile and the manufacturing method therefor.

2. Description of Related Art

In recent years, improving automobile fuel economy is important from the standpoint of protecting the global environment, and decreasing tire rolling resistance is strongly demanded. Among various resistance decreasing means, means for suppressing energy loss due to deformation of the side wall portion of the tire is effective. Accordingly, adoption of a highly pressurized tire and a low-profile tire which is low in height and has a small differential between an inside diameter and an outside diameter is increasing.

However, there are the following problems associated with a tire which is suppressed in deformation at the side wall portion, because a role a normal tire plays in suppressing a vibration transmission from a road to an automobile body decreases:

① Ride quality lowers to cause a so-called bumpy feeling. The reason is that vibration in a vertical direction in the range of 10 Hz or higher is damped only a little compared with the case of a normal tire.

With an automobile mounted with a normal tire, vibration in the range of 10–12 Hz or higher is absorbed or damped by the tire, and vibration lower than 10–12 Hz including a floating and tilting feeling of the range of 5 Hz or less and vibrating feeling of the range of 5–12 Hz is absorbed or damped by a suspension system. However, with the highly pressurized tire and the low-profile tire, since the stiffness of the tire in the vertical direction increases, vibration in the range 10–30 Hz is slightly damped.

Japanese Patent Publication HEI 5-338401 proposes a wheel where a vibration insulating rubber is disposed between a rim and a disk. In the proposed wheel, the rubber acts as a vibrational barrier for insulating vibration due to the viscosity or viscous elasticity of the rubber, and therefore, the rubber does not act as a spring damper. Further, the rubber acts in compression and has too high spring constant to effectively damp the above-described bumpy feeling. With almost all of the other proposed wheels having a vibration insulating rubber disposed between a rim and a disk, the rubber is intended to act in compression and is too hard to effectively damp the bumpy feeling.

② For the same reason as above, road noise (a noise hearing as "zaa" when a automobile runs on the road) increases. A vibration generated due to the road surface is transmitted to the body and vibrates the body panel to generate the road noise. Though the frequency range where the road noise appears changes according to a respective automobile, the road noise tends to appear in the range of 50–500 Hz from the general structure of an automobile. The road noise becomes particularly large in the vicinity of 250 Hz where the tire generates a columnar resonance.

③ Problems of instability in controllability arise.

More particularly, with a tire having a high rigidity at its tread such as a wide tire, the camber thrust force is small and the wheel tends to be drawn into a slanted portion of the road such as a wheel track. With a normal tire, since the gravitational force for drawing the wheel into the wheel track is negated by the camber thrust force, falling of the wheel into the wheel track does not tend to occur. Contrarily, with the tire having a high rigidity at its tread, since the tire tread is not easily deformed to the slant of the wheel track, the camber thrust force is too small to cancel out the effect of the gravitational force, so that falling of the wheel into the wheel track of the road easily occurs.

Further, with the conventional wheel where the rim and the disk are rigidly connected to each other, the road gripping force of the tire during rolling of the automobile decreases. When the automobile rolls due to a rapid turn, the automobile transversely inclines and a camber angle is generated between the automobile and the road surface. At the same time, the rim inclines and the tire inclines, and as a result, the road contact pressure of the tire becomes non-uniform in the width direction of the tire, and the road gripping force decreases. Thus, the force counteracting the centrifugal force also decreases, and despite efforts to steer the automobile during turning, the automobile tends to slip straight ahead. Conventionally, this slippage is prevented by the suspension system. However, when the rolling is large, the slippage cannot be prevented by the suspension system only.

Further, with the high performance tire such as a wide tire, a sudden ability to steer the automobile is likely to occur. A rising angle of the yaw rate (the yaw speed versus steering angle) of the high performance tire is large compared with that of the normal tire. Thus, with the high performance tire, steering suddenly works after a predetermined ineffective steering angle. If the high performance tire is mounted to the automobile which has been tuned for mounting the normal tire, the gain of steering is too great for the automobile to be steered, and a steering problem arises.

④ For compensating the imbalance and uniformity of the wheel, mounting a balancing weight to the wheel and the balancing the wheel are necessary.

⑤ With the wheel mounted with a rubber member between the rim and the disk, safety when the rubber member breaks should be maintained. Therefore, even if the rubber member breaks, the rim and the disk should not separate from each other, and even if even if the rubber member breaks, the rim and the disk should be able to transmit a drive torque and a brake torque between them. With almost all of the proposed wheels having the rubber member disposed between the rim and the disk, when the rubber member breaks, the drive torque and the brake torque are not transmitted between the rim and the disk any more. Therefore, such proposed wheels cannot be practically used.

SUMMARY OF THE INVENTION

An object of the invention is to provide a wheel with a damper for an automobile which can improve a ride quality.

Another object of the invention is to provide a wheel with a damper for an automobile which can suppress road noise as well as improve a ride quality.

Another object of the invention is to provide a wheel with a damper for an automobile which can improve steering controllability as well as ride quality.

Another object of the invention is to provide a wheel with a damper for an automobile which can attain self-alignment of the tire mounted wheel as well as improve ride quality.

Another object of the invention is to provide a wheel with a damper for an automobile which enables the automobile to operate safely for some distance even when a rubber member disposed between a rim and a disk breaks, as well as improve ride quality.

Another object of the invention is to provide a method for manufacturing with high productivity a wheel with a damper for an automobile capable of improving a ride quality.

The above objects can be performed by a wheel with a damper for an automobile and a method for manufacturing the same according to the invention as follows:

(1) A wheel with a damper for an automobile according to the present invention includes: a rim, a disk radially spaced from the rim, and a damper disposed between the rim and the disk. The damper has a rubber member having a spring constant. The spring constant of the rubber member of the damper is determined such that a first natural frequency of a vibrational system with a spring of the rubber member and a mass of the automobile is in a range of 6–12 Hz.

Preferably, the above wheel with a damper is constructed as follows:

(2) In the wheel with a damper of (1), the spring constant of the rubber member of the damper is selected such that the first natural frequency of the vibrational system with a spring of the rubber member and a mass of the automobile is in a range of 8–10 Hz.

(3) In the wheel with a damper of (1), a spring constant of the rubber member of the damper is determined such that a first natural frequency of a vibrational system with a spring of the rubber member and a mass of the rim positioned radially outside of the rubber member is in a range of 50–200 Hz.

(4) In the wheel with a damper of (3), the spring constant of the rubber member of the damper is selected such that said first natural frequency of the vibrational system with a spring of the rubber member and a mass of the rim is in a range of 70–150 Hz.

(5) In the wheel with a damper of (1), the rim is a rim for mounting a low-profile tire or a highly pressurized tire thereon.

(6) In the wheel with a damper of (1), the rubber member of the damper includes a first portion which causes mainly an elastic shear deflection to act as a spring when the rim and the disk cause a relative displacement to each other in a vertical direction.

(7) In the wheel with a damper of (1), the rubber member of the damper includes a second portion which is brought into contact with an opposing member to act as a stopper when the rim and the disk cause a greater relative displacement to each other in a vertical direction than a gap between the second portion and the opposing member.

(8) In the wheel with a damper of (1), the damper includes: a rim side member which is pushed against or connected to or fixed to or integrally formed with the rim, and a disk side member which is pushed against or connected to or fixed to or integrally formed with the disk. The damper includes a first portion having opposite ends. The first portion is fixed to the rim side member at one of the opposite ends and to the disk side member at the other of the opposite ends. A smallest diameter of the rim side member is smaller than a largest diameter of the disk side member so that the rim side member and the disk side member are impossible to separate from each other in an axial direction of the wheel.

(9) In the wheel with a damper of (6), the first portion of the rubber member includes a first end surface where the first portion is fixed to the rim or a rim side member fixed to the rim and a second end surface where the first portion is fixed to the disk or a disk side member fixed to the disk. The first end surface and the second end surface of the first portion of the rubber member extend perpendicularly to an axis of the wheel.

(10) In the wheel with a damper of (6), the first portion of the rubber member includes an inside surface and an outside surface which contact a space and are a free surface.

(11) In the wheel with a damper of (6), the first portion of the damper extends in an axial direction of the wheel or with an angle less than 10 degrees to an axis of the wheel when no load acts on the damper.

(12) In the wheel with a damper of (6), the rubber member is constructed of rubber or a laminate of rubber plates and metal plates or a metal-wire-embedded rubber.

(13) In the wheel with a damper of (6), the first portion of the rubber member is fixed to the rim or a rim side member fixed to the rim and to the disk or a disk side member fixed to the disk by vulcanization adhesion.

(14) In the wheel with a damper of (6), the first portion of the rubber member is fixed to the rim or a rim side member fixed to the rim and to the disk or a disk side member fixed to the disk by a mechanical fixing. In the mechanical fixing, a surface of the rim or the rim side member for fixing the rubber member is knurled and a surface of the disk or the disk side member for fixing the rubber member is knurled. The rubber member is pressed in an axial direction of the wheel against the knurled surfaces to engage the knurled surfaces.

(15) In the wheel with a damper of (7), a space is provided between the second portion of the rubber member of the damper and an opposing member which the second portion opposes. A size of the space in a radial direction of the wheel is selected to be 2d+α, where d is a deflection of the damper when a gravitational force of the automobile acts on the damper, and α is a value in a range of 0–1 mm.

(16) In the wheel with a damper of (7), the second portion of the rubber member is fixed by vulcanization adhesion to either one of the rim or a rim side member fixed to the rim and the disk or a disk side member fixed to the disk.

(17) In the wheel with a damper of (8), the rim side member is fixed to the rim by a first weld and the disk side member is fixed to the disk by a second weld. A position and a kind of the first weld and the second weld are selected such that a weld conducted after vulcanization adhesion of the rubber member for assembly does not give a damage due to welding heat to the rubber member.

(18) In the wheel with a damper of (8), the rim side member includes two sub-members. One sub-member of the two sub-members is pressed against said rim without being welded to the rim, and the other sub-member of the two sub-members is welded to the rim.

(19) In the wheel with a damper of (1), the rim is made from steel or wrought aluminum or cast aluminum or synthetic resin or fiber reinforced polymer.

(20) In the wheel with a damper of (1), the disk is made from steel or wrought aluminum or cast aluminum or synthetic resin or fiber reinforced polymer.

(21) In a method for manufacturing a wheel with a damper of (1), the method includes: casting a rim and disk integral product, cutting the product into two parts to obtain the rim and the disk; and mounting the damper between the rim and the disk to obtain the wheel with a damper.

With a wheel according to any of the above (1)–(20), since the first natural frequency of the vibrational system with a spring of the rubber member and a mass of the automobile is in the range of 6–12 Hz, vibration in the range slightly higher than the first natural frequency is damped so that the bumpy feeling is suppressed and ride quality is improved. When the resonance point of the vibrational system is set at slightly below 10 Hz, the bumpy feeling in the range of 10–30 Hz is absorbed and damped.

Further, since the damper has a soft structure, the tire inclines due to the deflection of the damper. As a result, the camber thrust force is large, and falling of the wheel into the wheel track is prevented. Further, when a camber angle is caused to the wheel due to rolling of the automobile, the rim inclines to be along the road, so that the road contact pressure of the tire is uniform, and the road holding characteristic of the tire is improved. As a result, the controllability during a turn becomes stable. Further, since the damper has a soft structure, there is a time lag in steering, so that a sudden ability to steer a car is modified, and controllability is improved.

Further, since the damper has a soft structure, the tire-mounted wheel has a self-aligning function. Namely, the tire-mounted wheel functions to select a center of rotation by itself and to rotate, and it becomes unnecessary to mount a balancing weight for compensating an imbalance of the tire-mounted wheel to the tire-mounted wheel. Thus, balancing work becomes unnecessary.

With a wheel according to any of the above (3) and (4), since the first natural frequency of the vibrational system with a spring of the rubber member and a mass of the rim is in the range of 50–200 Hz, vibration in the range slightly higher than the first natural frequency is damped so that vibration transmissibility in the range of 150–500 Hz is suppressed, and road noise is decreased.

With a wheel according to any of the above (6) and (9)–(14), since the rubber member acts in a shear deflection, the first portion can act as a soft spring having a low spring constant, the first natural frequency of the vibrational system with a spring of the rubber member and a mass of the automobile can be easily tuned in the range of 6–12 Hz.

With a wheel according to any of the above (7), (15) and (16), since the stopper rubber member is provided, even if the first portion of the rubber member breaks, the automobile can still operate due to the torque transmittance between the stopper rubber member and the opposing member.

With a wheel according to any of the above (8), (17) and (18), since a smallest diameter of the rim side member is smaller than a largest diameter of the disk side member, the rim side member and the disk side member cannot separate from each other in the axial direction of the wheel. Therefore, even if the rubber member of the damper breaks, the breakage is a fail-safe.

With the manufacturing method of a wheel according to (21), since the rim and the disk are integrally cast and then the cast is cut into the rim and disk, productivity is improved compared with the case where the rim and the disk are cast separately.

BRIEF DESCRIPTION OF THE DRAWINGS

The objects, features, and advantages of the present invention will become more apparent and will be more readily appreciated by the following detailed description of the preferred embodiments illustrated by the accompanying drawings, in which.

DETAILED DESCRIPTION OF THE PREFERRED EMBODIMENTS

Figure 1:
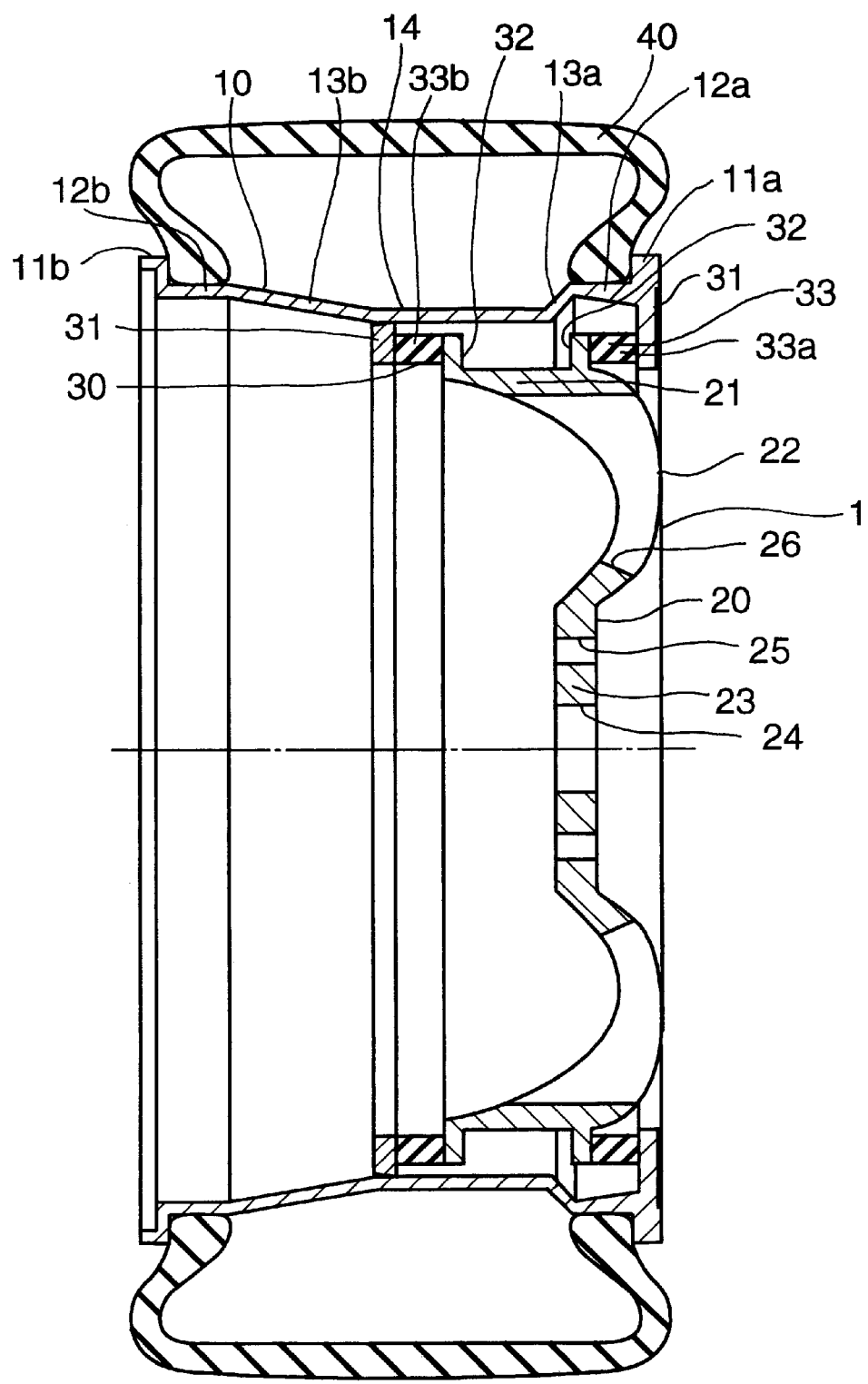
FIG. 1 is a cross-sectional view of a wheel with a damper for an automobile according to a first embodiment of the present invention.

Structural portions common or similar to all of the embodiments of the present invention are denoted with the same reference numerals throughout all of the first to fourteenth embodiments of the present invention.

First, structural portions common or similar to all of the embodiments of the present invention will be explained with reference to, for example, FIGS. 7 and 23–28.

Figure 7:
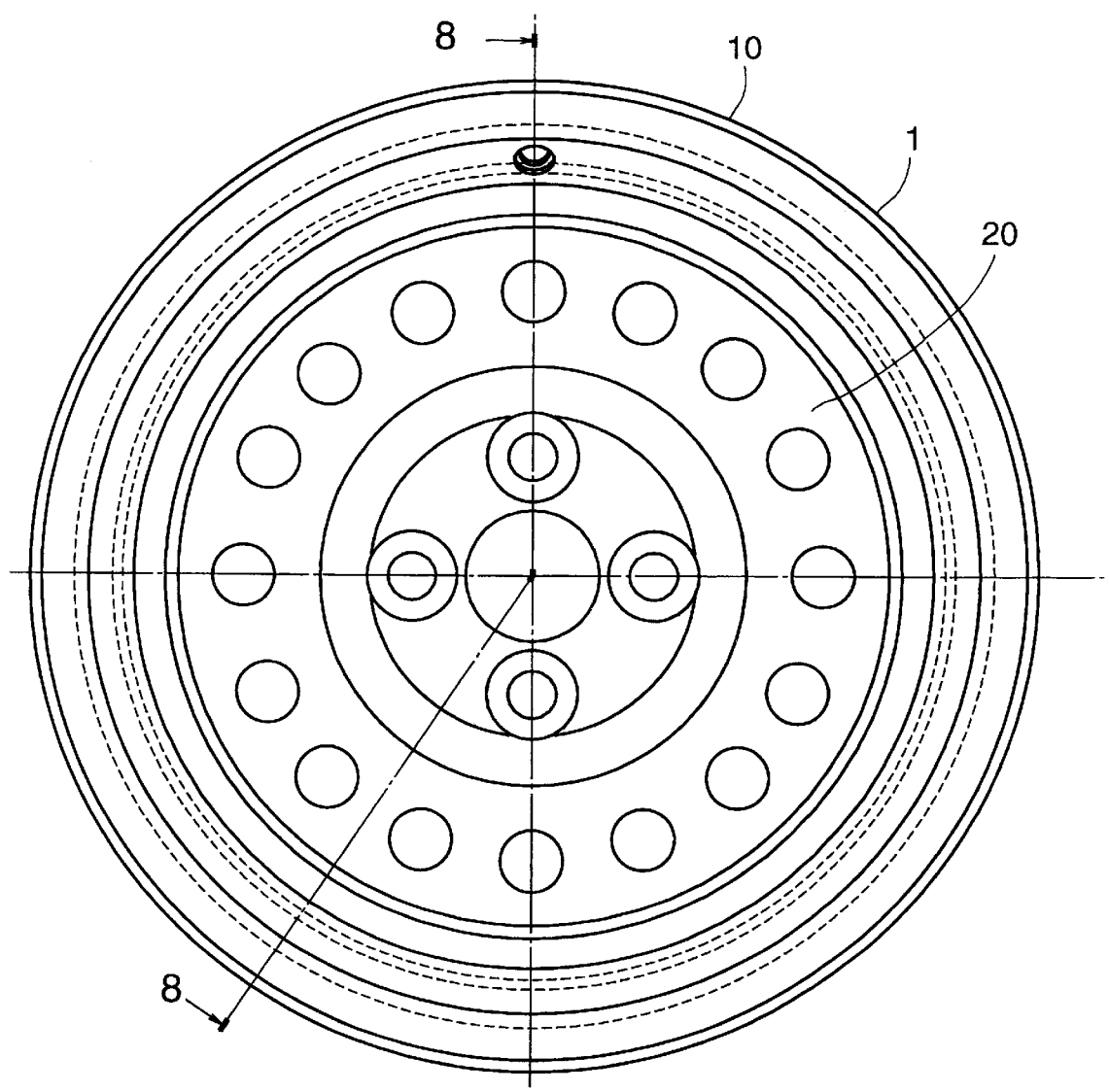
FIG. 7 is a front elevational view of a wheel with a damper for an automobile according to a seventh embodiment of the present invention.

As illustrated in FIG. 7, a wheel 1 with a damper for an automobile of the present invention includes a rim 10, a disk 20 radially spaced from the rim 10, and a damper 30 disposed between the rim 10 and the disk 20. The damper 30 has a rubber member 33 having a spring constant. The damper 30 connects the rim 10 and the disk 20. Due to the damper 30, the rim 10 and the disk 20 can displace to each other in a vertical direction when the wheel 1 is mounted to the automobile. The rubber member 33 of the damper 30 includes a first portion 33a, 33b. In a vibrational system having a spring of the first portion 33a, 33b and a mass of the automobile, the first portion 33a, 33b can damp a vibration slightly higher than a resonance point of the vibrational system. The first portion 33a, 33b is a member for damping the vibration due to its spring, and is not a member working as a vibration insulating barrier and is not a member aiming at decreasing the vibration due to viscosity.

To the rim 10, a low-profile tire 40 or a highly pressurized tire 40 is mounted.

The rim 10 is made from steel, wrought aluminum, cast aluminum, synthetic resin or fiber reinforced polymer. Similarly, the disk 20 is made from steel, wrought aluminum, cast aluminum, synthetic resin or fiber reinforced polymer.

Various combinations are possible. For example, both the rim 10 and the disk 20 may be made from steel or from aluminum or synthetic resin; or one of the rim 10 and the disk 20 may be made from steel, and the other of the rim 10 and the disk 20 made from aluminum or synthetic resin. Any combination is possible.

The rim 10 includes flange portions 11a and 11b (where reference a means a front side and reference b means a back side) located at opposite ends in an axial direction of the wheel, bead seat portions 12a and 12b connected to the flange portions 11a and 11b, respectively, side wall portions 13a and 13b connected to the bead seat portions 12a and 12b, respectively, and a drop portion 14 located at an axially central portion of the wheel.

The rim 10 may be a rim having no central drop portion, that is, a drop-less rim. In the case of the drop-less rim, the rim is divided, in the axial direction of the rim, into two portions: a drop-less inboard rim and an outboard rim coupled to the inboard rim after a tire has been fit to the inboard rim. By this structure, the damper 30 can be disposed at a space produced at the axially central portion of the drop-less rim.

The disk 20 includes an axially extending portion 21 located at a radially outmost portion of the disk, a hat portion 22 connected to the axially extending portion 21, and a hub coupling portion 23 located at a radially central portion of the disk. Decoration holes 26 are formed in the hat portion 22. A hub hole 24 is formed in a central portion of the hub coupling portion 23 and a plurality of bolt holes 25 are formed around the hub hole 24.

A radially outer surface of the flange portion 21 of the disk 20 is spaced in a radial direction of the wheel from an inside surface of a portion of the rim 10 located radially outside the flange portion 21 when the disk 20 is disposed radially inside the rim 10. This space allows the rim 10 and the disk 20 to displace from each other and is a space for disposing the damper 30.

The rubber member 33 extends continuously and throughout an entire circumference of the wheel.

The rubber member 33 is constructed of rubber, or a laminate of rubber plates and hard plates, or a metal-wire-embedded rubber. In the case where the rubber member 33 is constructed of a laminate of rubber plates and hard (metal or plastic) plates which extend perpendicularly to the axial direction of the wheel, a spring constant of the rubber member 33 is increased in the axial direction of the wheel.

The damper 30 may include a rim side member 31 and a disk side member 32. The rim side member 31 and the disk side member 32 are made from metal (steel or aluminum alloy, etc.) or hard plastic. In a case where the rim side member 31 and the disk side member 32 are not provided, the rubber member 33 is fixed directly to the rim 10 and the disk 20.

The rim side member 31 includes one or more sub-members and extends over the entire circumference in the circumferential direction of the wheel. The rim side member 31 is connected to or fixed to or integrally formed with the rim 10, or may be pushed against the rim 10 without being welded to the rim 10.

The disk side member 32 extends over the entire circumference in the circumferential direction of the wheel. The disk side member 32 is connected to or fixed to or integrally formed with the disk 20, or may be pushed against the disk 20 without being welded to the disk 20. The disk side member 32 includes one or more sub-members. When the disk side member 32 includes a plurality of sub-members, the sub-members may be directly coupled to each other, or may be indirectly coupled to each other via the disk 20.

A smallest diameter of the rim side member 31 is smaller than a largest diameter of the disk side member 32. Due to this structure, even if the rubber member 33 breaks, the rim side member 31 and the disk side member 32 are prevented from separating from each other in the axial direction of the wheel. More particularly, after assembly, the rim side member 31 and the disk side member 32 are capable of interfering with each other in the axial direction of the wheel, so that even if the rubber member 33 breaks, the rim side member 31 and the disk side member 32 are impossible to separate from each other. In this structure, to facilitate assembly, at least one sub-member of the rim side member 31 or the disk side member 32 has to be welded to the rim or the disk after assembly of the rubber member 33 by vulcanization adhesion. The weld conducted after vulcanization adhesion of the rubber member 33 has to be sufficiently spaced from the rubber member 33 so as not to cause heat damage to the rubber member 33 or a type of welding, such as a laser welding, has to be used so as to restrict the weld heat to a localized area.

The rubber member 33 includes one or more (two in the drawings) first portions 33a and 33b. The first portions 33a and 33b are spaced from each other in the axial direction of the wheel. Each first portion 33a, 33b is fixed to the rim 10 or the rim side member 31 at one end, and is fixed to the disk 20 or the disk side member 32 at the other end. Each first portion 33a, 33b connects a rim side and a disk side.

Preferably, fixing of the first portion 33a, 33b to the rim 10 or the rim side member 31 and to the disk 20 or the disk side member 32 is by vulcanization adhesion. This vulcanization adhesion may be replaced with mechanical fixing. Such a mechanical fixing includes a fixing where a surface of the rim 10 or the rim side member 31 for fixing the rubber member 33 is knurled and a surface of the disk 20 or the disk side member 32 for fixing the rubber member 33 is knurled, and then the rubber member 33 is pressed in an axial direction of the wheel against the knurled surfaces to engage the knurled surfaces in the circumferential direction of the wheel and the vertical direction.

In the case where rim side member 31 and the disk side member 32 are welded to the rim 10 and the disk 20, respectively, the welds conducted after vulcanization adhesion of the rubber member 33 should be sufficiently spaced from the rubber member 33 so as not to cause thermal damage to the rubber member 33.

The first portion 33a, 33b causes mainly an elastic shear deflection and acts as a spring when the rim 10 and the disk 20 displace from each other in the vertical direction. The shear deflection may be accompanied by a bending deflection and/or a tension-compression deflection. However, the shear deflection is predominant compared with the bending deflection and/or the tension-compression deflection.

In order that the first portion 33a, 33b causes mainly an elastic shear deflection, the wheel is designed as follows:

The first portion 33a, 33b of the rubber member 33 includes a first end surface where the first portion 33a, 33b is fixed to the rim 10 or the rim side member 31 fixed to the rim 10 and a second end surface where the first portion 33a, 33b is fixed to the disk 20 or the disk side member 32 fixed to the disk 20. The first end surface and the second end surface of the first portion 33a, 33b of the rubber member 33 extend perpendicularly to an axis of the wheel. By this structure, when the rim 10 and the disk 20 displace relative to each other in the vertical direction, the first portion 33a, 33b causes a shear deflection. If the first end surface and the second end surface were inclined from a direction perpendicular to the axial direction of the wheel, a tension-compression deflection would be generated in the first portion 33a, 33b as well as a shear deflection. As a result, the spring constant of the rubber member in the vertical direction would be large and the rubber member would be hard, and a desired damping would not be performed.

Figure 25:
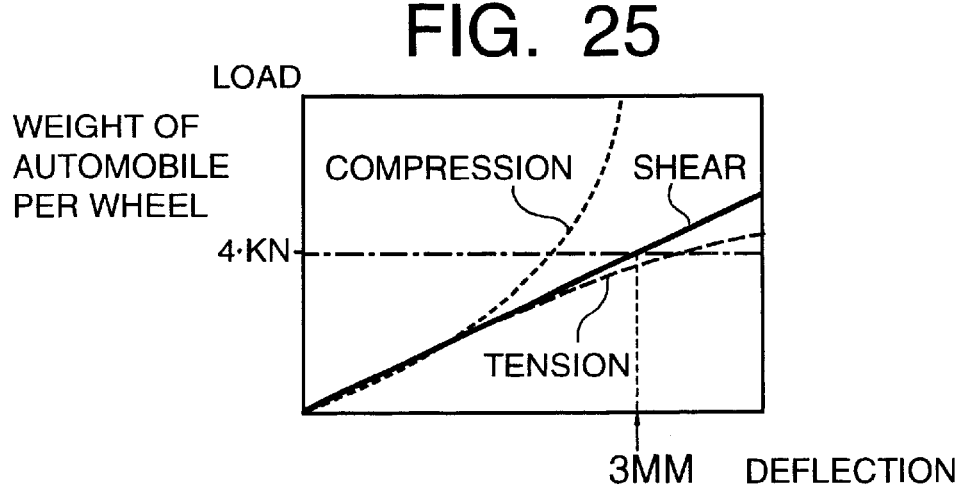
FIG. 25 is a graphical presentation of a load versus deflection characteristic of a spring of the wheel with a damper according to any embodiment of the present invention and a conventional wheel having no damper.

The first portion 33a, 33b of the rubber member 33 includes an inside cylindrical surface and an outside cylindrical surface which contact a space and are free, unconstrained surfaces. The reason is that if the inside and outside surfaces of the first portion 33a, 33b were constrained by other members, a tension-compression stress would be generated in the first portion, and the rubber would not cause a shear deflection. As illustrated in FIG. 25, a deflection versus load relationship of the shear deflection is linear and the spring constant of the rubber working in a shear deflection is smaller than that in a tension-compression deflection.

Preferably, the first portion 33a, 33b of the rubber member 33 of the damper 30 extends in an axial direction of the wheel or with an angle less than 10 degrees (more preferably, less than 5 degrees) to an axis of the wheel when no load acts on the damper 30. The reason is that the smaller the angle, the more suppressed the tension-compression deflection is. As a result, the shear deflection is predominant, and the deflection versus load relationship is substantially linear and the spring constant is relatively small compared with a case where the rubber member works in a tension-compression. So long as the first portion 33a, 33b causes a shear deflection, the angle may be greater than 10 degrees, or for example, may be 15 degrees or 20 degrees.

Preferably, two first portions 33a and 33b are provided. These two first portions are spaced from each other in the axial direction of the wheel, and more particularly, one first portion 33a is located at one side of the axial center of the wheel and the other first portion 33b is located at the other side of the axial center of the wheel. The reason is that a tilting of the rim 10 relative to an axis of the disk 20 due to the deflection of the rubber member 33 is suppressed to an appropriate order so that an excessive deflection is not generated to the first portions 33a and 33b, whereby a high durability of the rubber member 33 is obtained.

The rubber member 33 of the damper 30 includes a second portion 33c. The second portion 33c extends in the axial direction between the two first portions 33a and 33b. The second portion 33c has the inside and the outside surfaces. The second portion 33c contacts a space at one of the inside and outside surfaces and contacts any one of the rim 10, the rim side member 31, the disk 20, and the disk side member 32 at the other of the inside and outside surfaces. There is provided a gap between the second portion 33c and an opposing member. A radial dimension δ of the gap is set to be $2d+\alpha$, where d is a deflection of the damper 30 when a gravitational force of the automobile acts on the damper 30, and α is a value in a range of 0–1 mm. The value of α may exceed 1 mm. When the rim 10 and the disk 20 cause a greater relative displacement to each other in a vertical direction than the gap provided between the second portion 33c and the opposing member, the second portion 33c is brought into contact with the opposing member and acts as a stopper. As a result, the deflection of the first portions 33a and 33b is restricted to less than a predetermined value and the durability of the first portions 33a and 33b is assured.

Since the second portion 33c contacts the space at one surface of the second portion, the rim 10 and the disk 20 can displace relative to each other in the vertical direction till the second portion 33c begins to contact the opposing member, whereby the first portions 33a and 33b can cause a shear deflection without being constrained. If the second portion did not contact the space at the one surface, the rim 10 and the disk 20 would not be able to displace from each other in the vertical direction and thus the first portions 33a and 33b would not be able to cause a shear deflection. The space enables it.

When the first portions 33a and 33b break, the second portion 33c comes into contact with the opposing member beneath the center of the wheel and transmits a drive torque and a brake torque between the rim 10 and the disk 20 to thereby enable the automobile to operate safely for some distance (for example, for one hundred kilometers). Before the first portions 33a and 33b are completely broken, the second portion 33c begins to contact with the opposing member and so the surface of the second portion 33c is abraded by the opposing member. Further, the opposing member will engage the rubber member. As a result, the friction between the second portion 33c and the opposing member is relatively large, and the drive torque and the brake torque are sufficiently transmitted. Due to the second portion 33c, safe operation and a fail-safe are obtained when the first portions 33a and 33b break.

Figure 6:
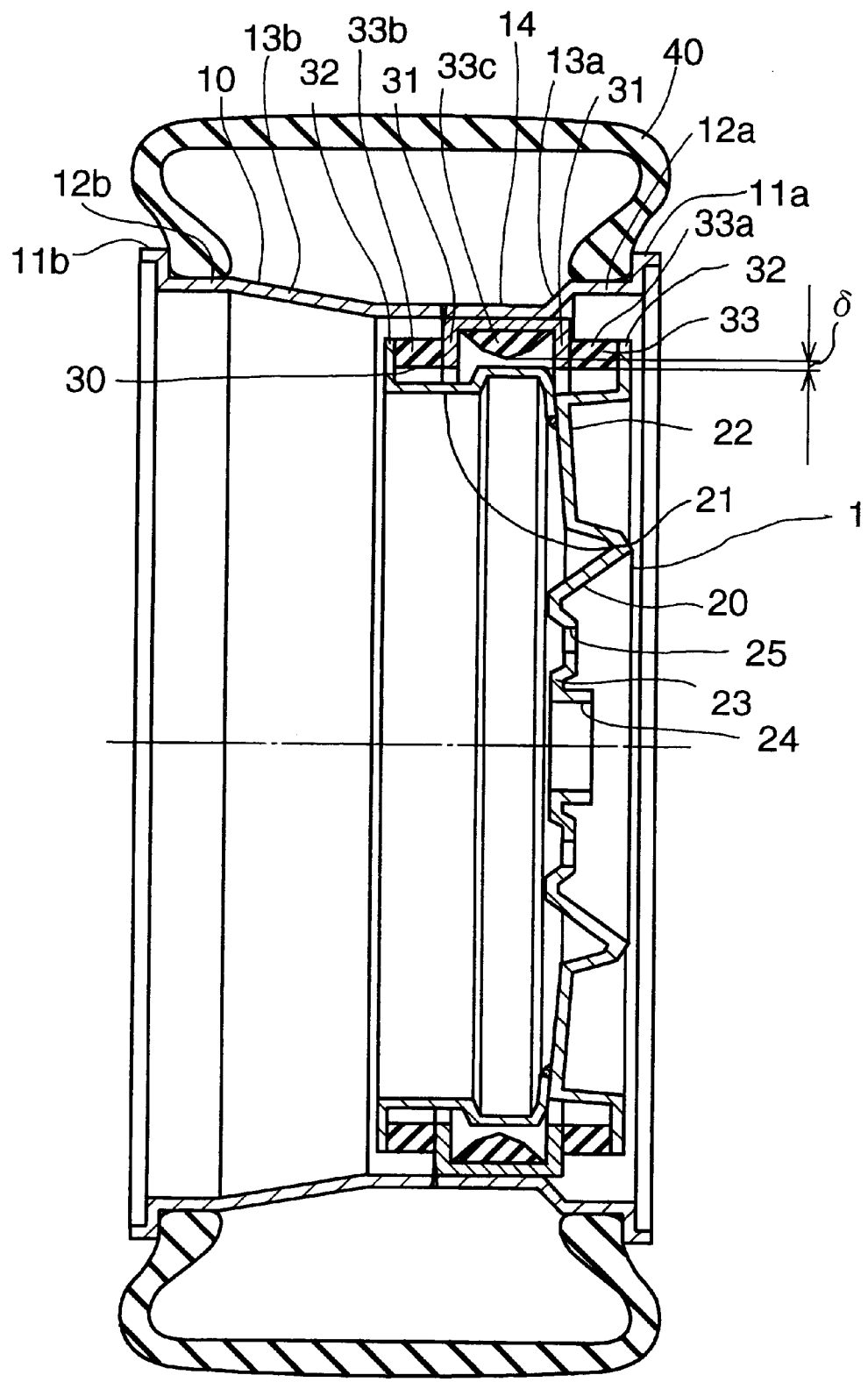
FIG. 6 is a cross-sectional view of a wheel with a damper for an automobile according to a sixth embodiment of the present invention.

As illustrated in FIG. 6, the surface of the second portion 33c opposing the opposing member may be tapered toward the opposing member. The taper reduces a shock when the second portion 33c collides with the opposing member. The spring constant (synthetic spring constant) of the first portions 33a and 33b of the rubber member 33 of the damper 30 is determined or set such that a first natural frequency of a vibrational system comprising a spring of the first portions 33a and 33b of the rubber member 33 and a mass of the automobile is in a range of approximately 6–12 Hz. This setting of the spring constant can be performed by selecting the configuration and dimension of the first portions 33a and 33b.

Due to this structure, vibration in the range slightly higher than the set first natural frequency is damped so that the bumpy feeling is suppressed and the ride quality is improved. When the resonance point of the vibrational system is set at 8–10 Hz, the bumpy feeling in the range of approximately 10–30 Hz is absorbed and damped.

A relationship between the first natural frequency f and the deflection d [m] is:

$$d=0.2482/f^2$$

From this equation, when the deflection d is 3 mm, the first natural frequency is 9 Hz. This value is for a static spring. Since, in rubber, the dynamic spring constant is greater than the static spring constant, the first natural frequency will be about 10 Hz. This holds irrespective of the magnitude of the mass of the automobile, more particularly, even where the mass is 400 kg or 500 kg.

Preferably, a spring constant (synthetic spring constant) of the first portions 33a and 33b of the rubber member 33 of the damper 30 is determined or set such that a fist natural frequency of a vibrational system comprising a spring of the first portions 33a and 33b of the rubber member 30 and a mass of the rim 10 positioned radially outside of the rubber member 33 is in a range of approximately 50–200 Hz.

More preferably, the spring constant of the first portions 33a and 33b of the rubber member 33 of the damper 30 is selected such that the first natural frequency of the vibrational system with a spring of the rubber member 33 and a mass of the rim 10 is in a range of approximately 70–150 Hz.

By this structure, the vibration in the range slightly higher than the first natural frequency is damped so that when the spring constant is set in the range of approximately 70–150 Hz, the vibration transmissibility in the range of approximately 150–500 Hz, for example, of 250 Hz is suppressed and road noise is decreased.

Figure 28:
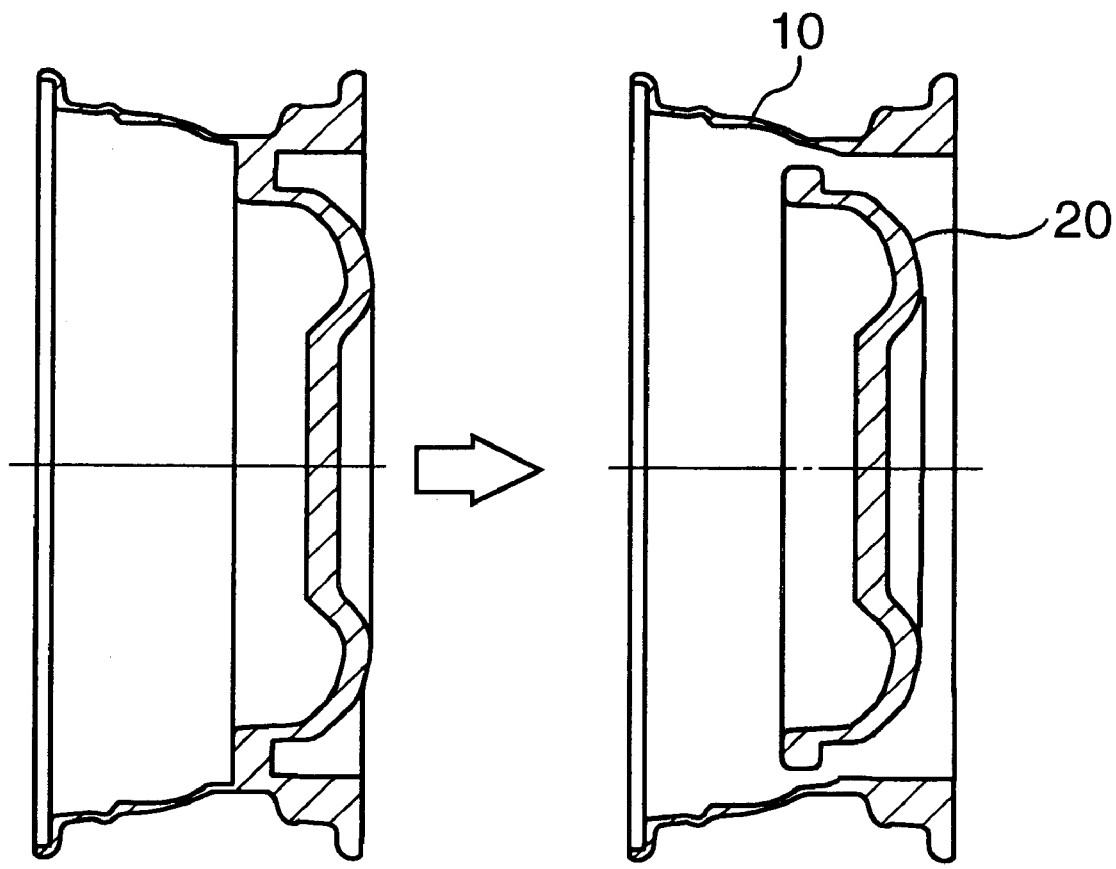
FIG. 28 is a schematic process diagram of a manufacturing method of a wheel with a damper according to an embodiment of the present invention.

As illustrated in FIG. 28, a method for manufacturing the above wheel with a damper for an automobile includes: casting a rim and disk integral product, cutting the product into two parts to obtain the rim 10 and the disk 20, and mounting the damper 30 between the rim 10 and the disk 20 to obtain the wheel with a damper. By this manufacturing method, the casting step is reduced to one step as opposed to two in the case where the rim and the disk are cast separately, and the productivity increases. The cutting step is necessary, but since the cutting step is far smaller in terms of time required and work amount than the casting step, overall productivity increases.

Next, action of the above wheel with a damper will be explained with reference to FIGS. 23–27.

Firstly, reduction of the bumpy feeling will be explained.

Figure 3:
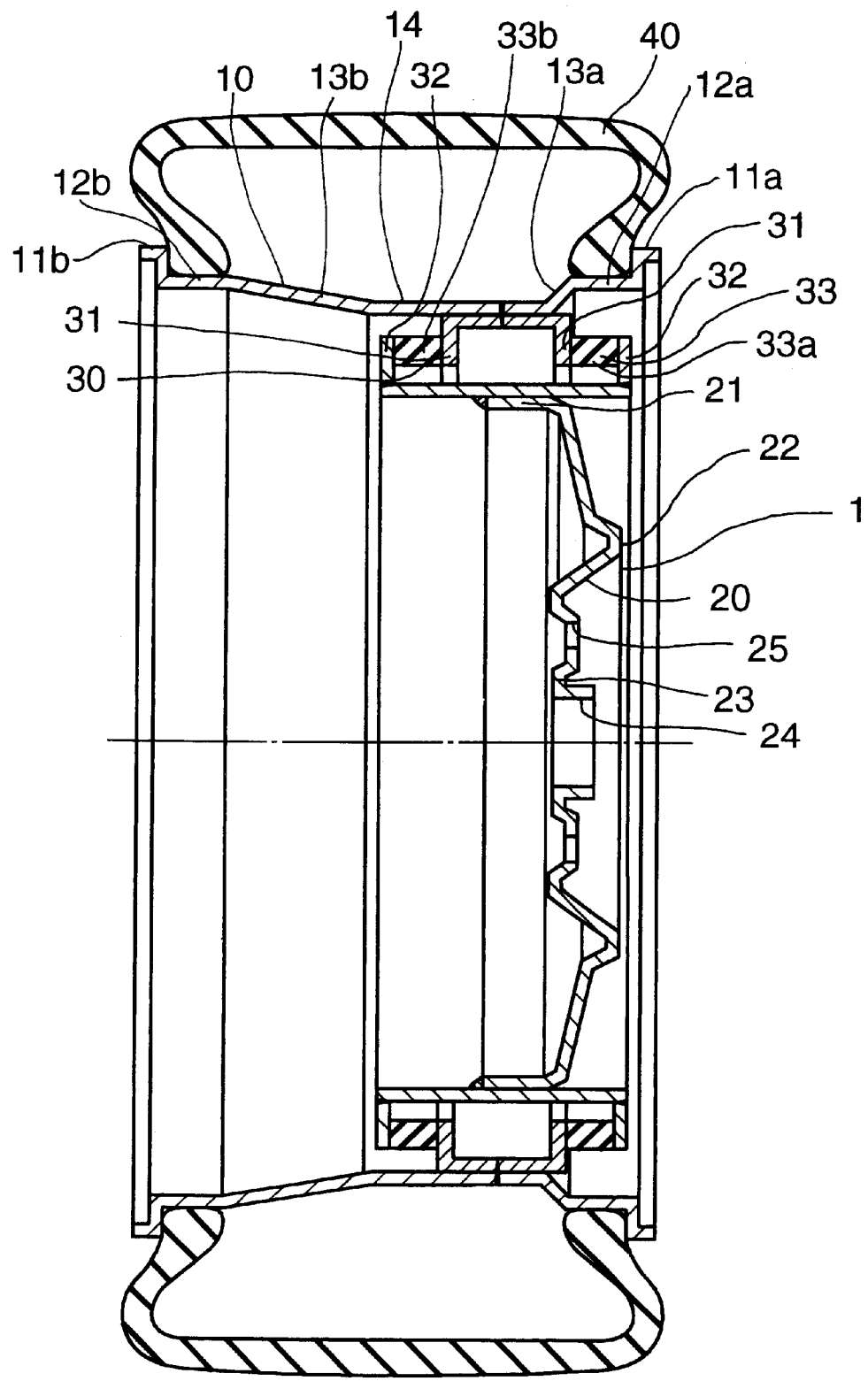
FIG. 3 is a cross-sectional view of a wheel with a damper for an automobile according to a third embodiment of the present invention.
Figure 4:
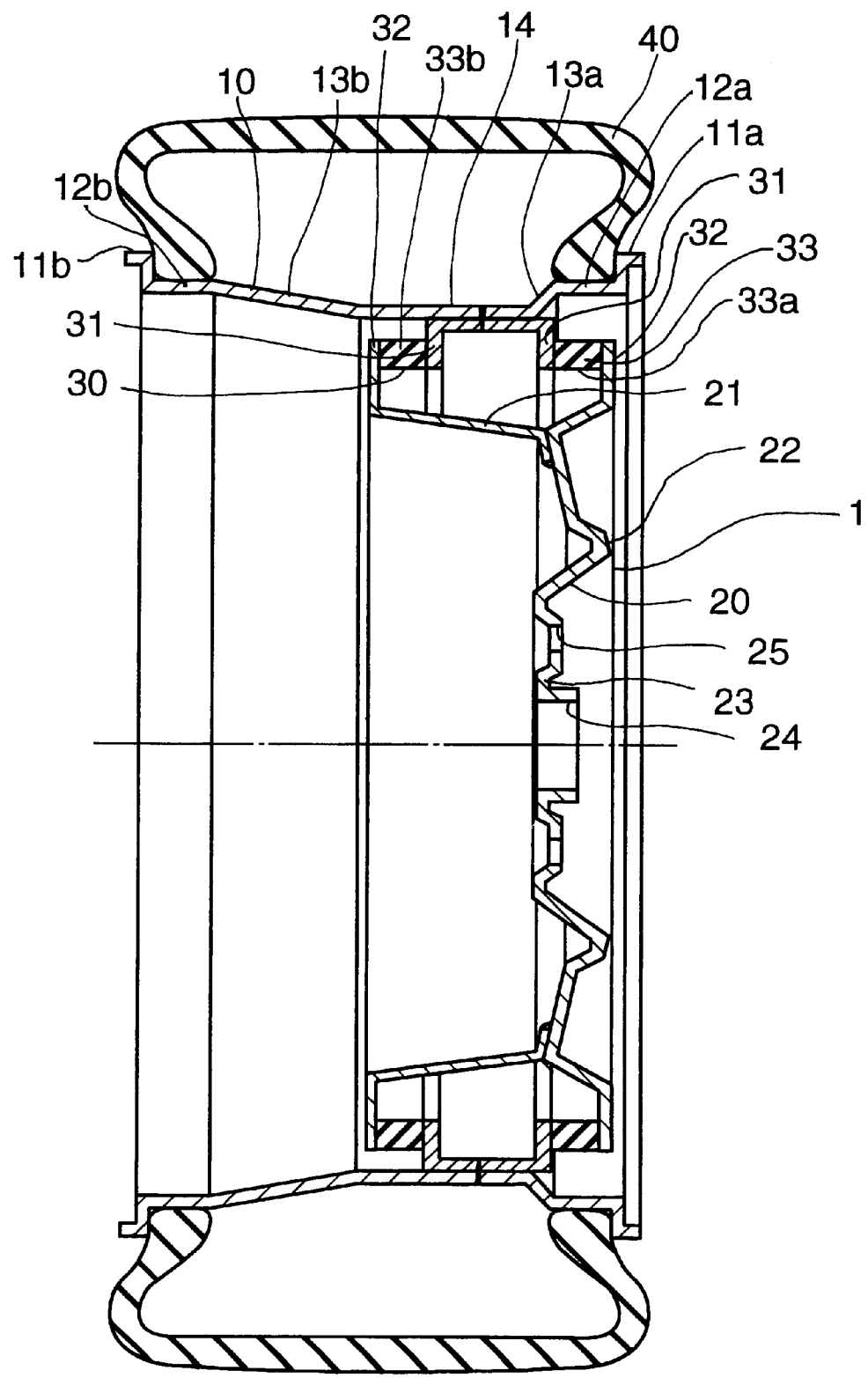
FIG. 4 is a cross-sectional view of a wheel with a damper for an automobile according to a fourth embodiment of the present invention.

FIG. 3 illustrates a vibrational system model having a mass M of the automobile and a spring constant K of a vertically acting spring of the rubber member 33. The first natural frequency of this model is:

$$f=(\tfrac{1}{2}\pi)\cdot(K/M)^{1/2}$$

To make a system having its first natural frequency at 8–10 Hz, for example, at 10 Hz in order to suppress the vibration in the range of approximately 10–30 Hz, when the mass of the automobile per wheel is about 400 kg, the spring constant should be:

$$K=1611\text{ N/mm}$$

This value is for a dynamic spring constant. In the case of rubber, the static spring constant is smaller than this value, and will be 1300 N/mm. When the load of 4 KN (400 kgf) acts on the spring, the spring deflects about 3 mm as illustrated in FIG. 25. The deflection value may vary within the range of approximately 1–6 mm.

Figure 24:
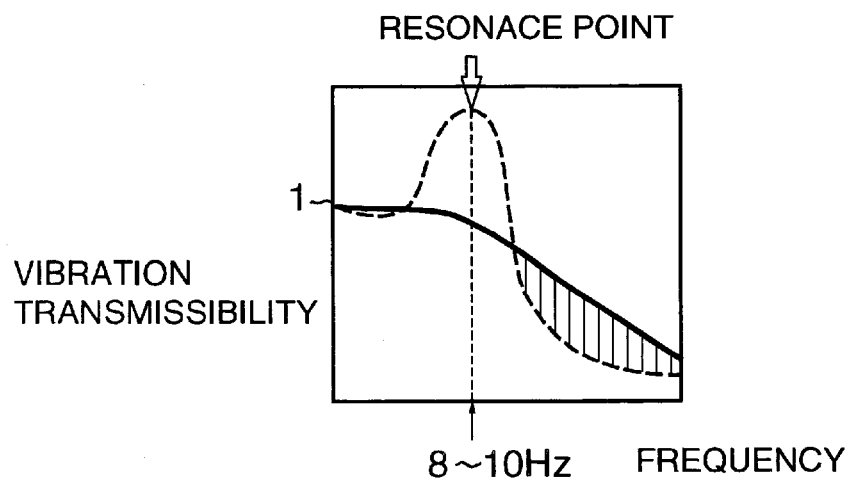
FIG. 24 is a graphical presentation of a vibration transmissibility versus frequency characteristic of the wheel with a damper according to any embodiment of the present invention and a conventional wheel having no damper.

The vibrational characteristic of the above vibrational system is illustrated in FIG. 24. As will be understood from FIG. 24, the vibrational transmissibility (acceleration transmissibility) is decreased in the range slightly higher than the resonance point. In the case where the resonance point is 8–10 Hz, the vibration in the range of approximately 10–30 Hz, for example, at 15 Hz and the vicinity thereof is decreased, so that the bumpy feeling above 10 Hz can be reduced.

To obtain the characteristic of FIG. 24, the rubber member 33 of the damper 30 should have a linear load versus deflection characteristic around the equilibrium point under the load of the automobile weight. For the linear characteristic, the first portions 33a and 33b of the rubber member 33 is caused to yield an elastic shear deflection. If the first portions 33a and 33b of the rubber member 33 causes a tension-compression deflection, the characteristic becomes non-linear as illustrated by a broken line in FIG. 23, and the spring constant becomes too large, and as a result, the desired vibration damping cannot be obtained. In order that the first portions 33a and 33b surely performs the elastic shear deflection, the first portions 33a and 33b are caused to extend in the axial direction of the wheel, and even when inclined from the axial direction of the wheel, the angle is set less than 10 degrees. Further, the inside surface and the outside surface of the first portions 33a and 33b are caused to be free surfaces contacting a space, and the end surfaces of the first portions 33a and 33b are caused to extend perpendicularly to the axial direction of the wheel.

Figure 26:
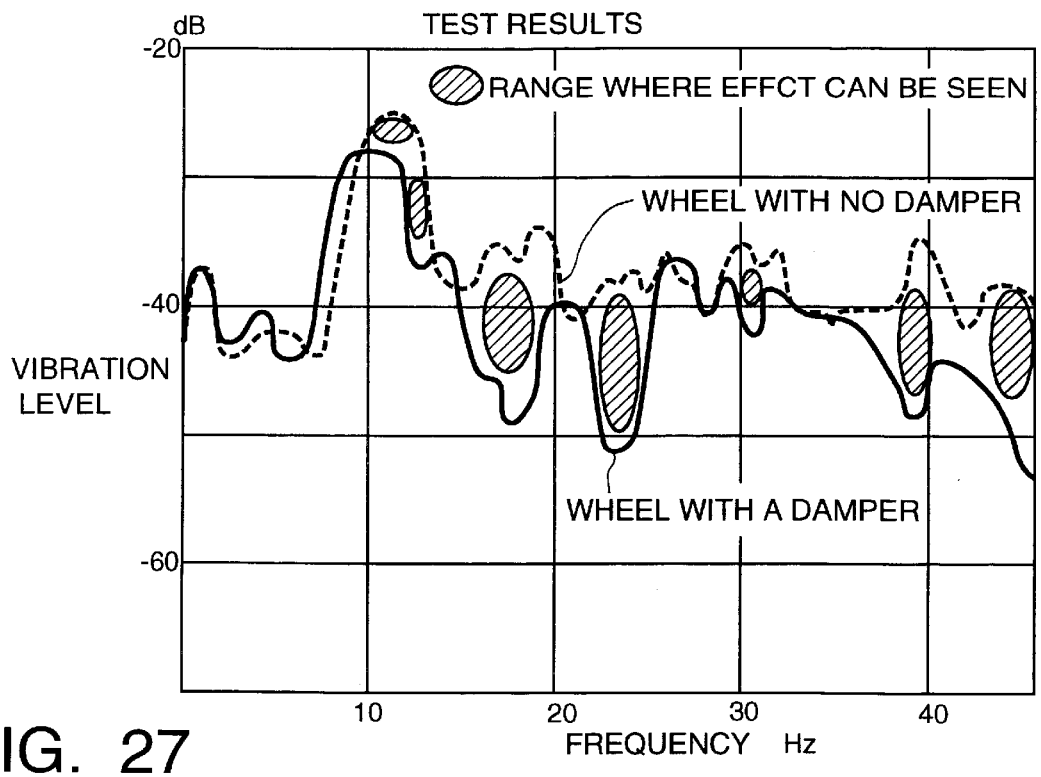
FIG. 26 is a graphical presentation of a vibration level (dB) versus frequency (Hz) characteristic on a spring (at a seat rail) in a low-frequency range (0–45 Hz) in a case where an automobile mounted with the wheel with a damper according to any embodiment of the present invention runs on a rough road and in a case where an automobile mounted with the conventional wheel having no damper runs on the rough road.

FIG. 26 illustrates a vibration level (dB) versus frequency (Hz) characteristic of a spring (at a seat rail) in a low-frequency range (0–45 Hz) in a case where an automobile mounted with the wheel having a damper according to the present invention runs on a rough road. FIG. 26 also illustrates the vibrational level in a case where an automobile mounted with the conventional wheel having no damper runs on the rough road. As will be understood from FIG. 26, with the wheel having a damper according to the present invention, a considerable decrease in vibration can be seen in the range of approximately 10–30 Hz. Due to the vibrational decrease, the bumpy feeling experienced in the range of 10–30 Hz, for example, at 15 Hz, is reduced.

The road noise is reduced in the following way. Since the mass m of the rim 10 and the rim side member 31 is 5–10 kg and the spring constant K of the first portions 33a and 33b of the rubber member 33 of the damper 30 is about 2900 N/mm, the first natural frequency of the spring-mass system is in the range of 50–200 Hz, for example, at 120 Hz. Therefore, vibration in a slightly higher range than the first natural frequency, that is, in the range of 150–250 Hz, for example, at 250 Hz can be effectively reduced. In this instance, the road noise is a noise generated when the vibration from the road transmits to an automobile body to vibrate a body panel, etc. From the structure of automobiles, the resonance point exists in the range 150–500 Hz. Especially, the noise is amplified at the vicinity of 250 Hz where a columnar resonance of the tire tends to occur.

Figure 27:
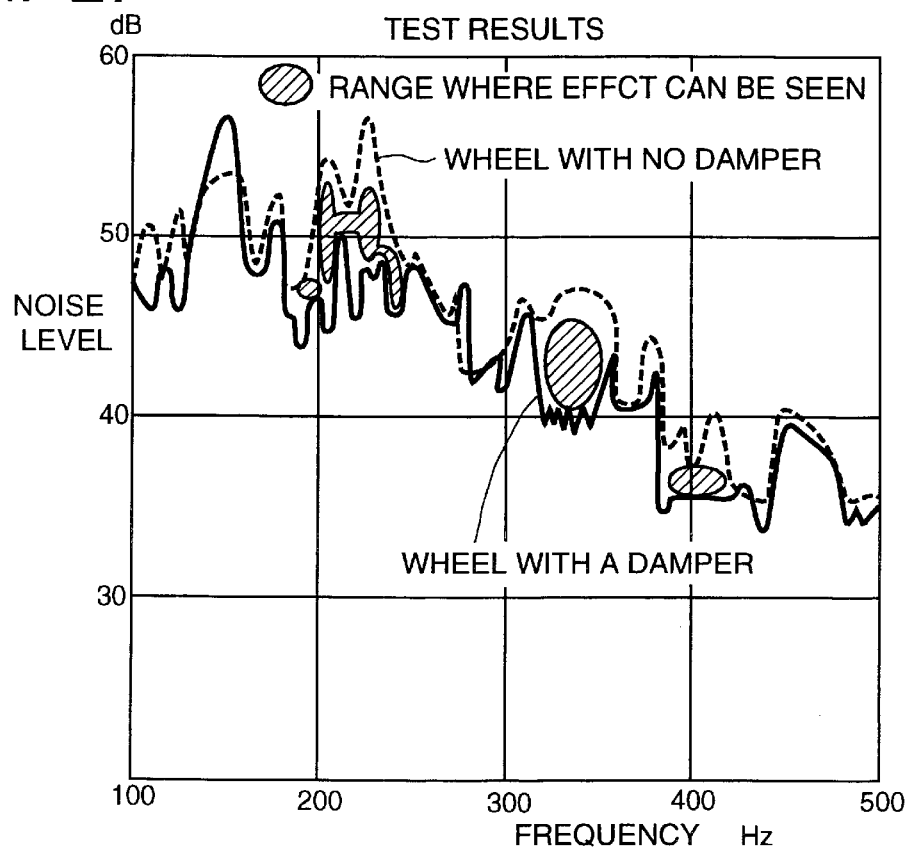
FIG. 27 presentation of a noise level (dB) versus frequency (Hz) characteristic in a high-frequency range (100–500 Hz) in a case where the automobile mounted with the wheel with a damper according to any embodiment of the present invention runs on a rough road and in a case where the automobile mounted with the convential heel having no damper runs on the rough road.

FIG. 27 illustrates a noise level (dB) versus frequency (Hz) characteristic in a high-frequency range of 100–500 Hz. As will be understood from FIG. 27, in the case where the automobile mounted with the wheel having a damper according to the present invention runs on a road, the road noise in the range of 150–500 Hz, for example, at 250 Hz, is effectively reduced as compared with the case of an automobile mounted with the conventional wheel having no damper. The reason is as follows: when a synthetic vibrational wave including many kinds of frequencies is entered into a system having multi-resonance points such as an automobile, the system selects the wave having the resonance point of about 120 Hz and causes a resonance with the wave, whereby the vibration slightly above the resonance point, that is, in the range of 150–500 Hz, for example, at about 250 Hz, is effectively suppressed.

Further, there are the following actions or effects to the wheel with a damper of the present invention:

Since the vibration is absorbed at the damper 30, the damper is an effective countermeasure for reducing a vibration before it enters the automobile body. Initiating a countermeasure after a vibration enters the body will be difficult in the case of a multi-resonance point structure such as an automobile body, and will be costly and make the fuel economy worse because heavy members will be necessary for the countermeasure.

Further, since the damper 30 is a soft structure, the tire 40 inclines due to the deflection of the damper 30. As a result, the camber thrust force is large, and falling of the wheel into a road wheel track can be prevented.

Further, when a camber angle is generated to the wheel due to rolling of the automobile, the rim inclines along the road, so that the road contact pressure of the tire is uniform and the road gripping characteristic of the tire is increased. As a result, controllability during a turn becomes stable.

Further, since the damper 30 is a soft structure, a curve of a yaw speed versus steering angle characteristic (a yaw rate) of a high performance tire 40 mounted to the wheel with the damper 30 is modified to a curve of that of a normal tire, and therefore there is a time lag between the hand steering and the yaw. As a result, a sudden ability to steer the automobile is modified and controllability is improved.

Further, since the damper has a soft structure, the tire-mounted wheel has a self-aligning function, namely, a function to select a center of rotation by itself and to rotate. As a result, it becomes unnecessary to mount a balance weight for compensating an imbalance of the tire-mounted wheel to the wheel, and thus balancing work becomes unnecessary.

Next, structures unique to each embodiment of the present invention will be explained.

With a wheel having a damper according to a first embodiment of the present invention, as illustrated in FIG. 1, the disk 20 is made from cast aluminum or synthetic resin, and the rim 10 is made from cast aluminum or wrought aluminum.

The disk side member 32 is formed integrally with the disk 20, and the rim side member 31 is formed integrally with the rim 10 or is welded to the rim 10. The rim side members 31 includes two sub-members: one sub-member is located radially inside the front side rim flange 11a, and the other sub-member is located radially inside the drop portion 14. The rim side member 31 envelopes the disk side member 32 from outside in the axial direction of the wheel, so that the rim 10 and the disk 20 cannot separate from each other in the axial direction of the wheel. The two first portions 33a and 33b are at the same level in the radial direction of the wheel.

The rubber member 33 does not have a second portion 33c as a stopper. The rubber member 33 is fixed to the rim side member 31 and the disk side member 32 by vulcanization adhesion.

Figure 2:
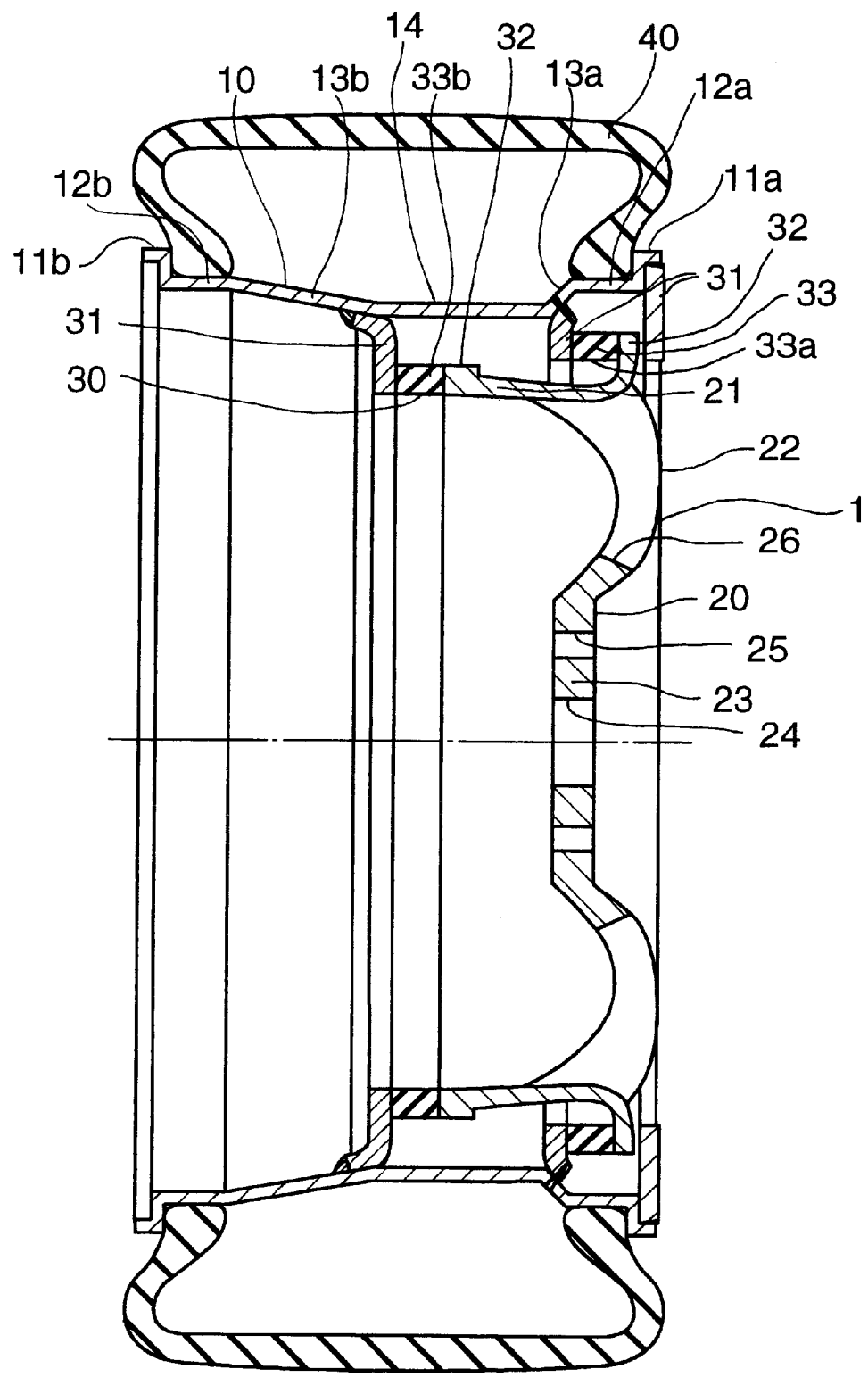
FIG. 2 is a cross-sectional view of a wheel with a damper for an automobile according to a second embodiment of the present invention.

With a wheel having a damper according to a second embodiment of the present invention, as illustrated in FIG. 2, the disk 20 is made from cast aluminum or synthetic resin, and the rim 10 is made from steel or wrought aluminum.

The disk side member 32 is formed integrally with the disk 20. The rim side member 31 includes three sub-members which are welded to the rim 10. A sub-member of the rim side member 31 located at a front side is located radially inside the front side rim flange 11a, and the other two sub-members are located radially inside the drop portion 14. The sub-member located at the front side prevents the rim 10 and the disk 20 from separating from each other when the rubber member 33 breaks. The rim side member 31 envelopes the disk side member 32 from outside in the axial direction of the wheel. The two first portions 33a and 33b of the rubber member 33 are at different levels in the radial direction of the wheel, so that assembly of the damper 30 is easy.

The rubber member 33 does not have a second portion 33c as a stopper. The rubber member 33 is fixed to the rim side member 31 and the disk side member 32 by vulcanization adhesion.

With a wheel having a damper according to a third embodiment of the present invention, as illustrated in FIG. 3, the disk 20 is made from steel or wrought aluminum, and the rim 10 is made from steel or wrought aluminum.

The disk side member 32 is welded to the disk 20, and the rim side member 31 is welded to the rim 10. The rim side members 31 is located radially inside the drop portion 14. The disk side member 32 envelopes the rim side member 31 from outside in the axial direction of the wheel, so that the rim 10 and the disk 20 cannot separate from each other in the axial direction of the wheel. The two first portions 33a and 33b of the rubber member 33 are at the same level in the radial direction of the wheel.

The rubber member 33 does not have a second portion 33c as a stopper. The rubber member 33 is fixed to the rim side member 31 and the disk side member 32 by vulcanization adhesion.

With a wheel having a damper according to a fourth embodiment of the present invention, as illustrated in FIG.

4, the disk 20 is made from steel or wrought aluminum, and the rim 10 is made from steel or wrought aluminum.

The disk side member 32 has two portions: one portion is integrally formed with the disk side member 32 and the other portion is welded to the disk side member 20 and constitutes the radially extending portion 21 of the disk 20. The rim side member 31 is laser-welded to the rim 10. The rim side members 31 is located radially inside the drop portion 14. The disk side member 32 envelopes the rim side member 31 from outside in the axial direction of the wheel, so that the rim 10 and the disk 20 cannot separate from each other in the axial direction of the wheel. The two first portions 33a and 33b of the rubber member 33 are at the same level in the radial direction of the wheel.

The rubber member 33 does not have a second portion 33c as a stopper. The rubber member 33 is fixed to the rim side member 31 and the disk side member 32 by vulcanization adhesion.

Figure 5:
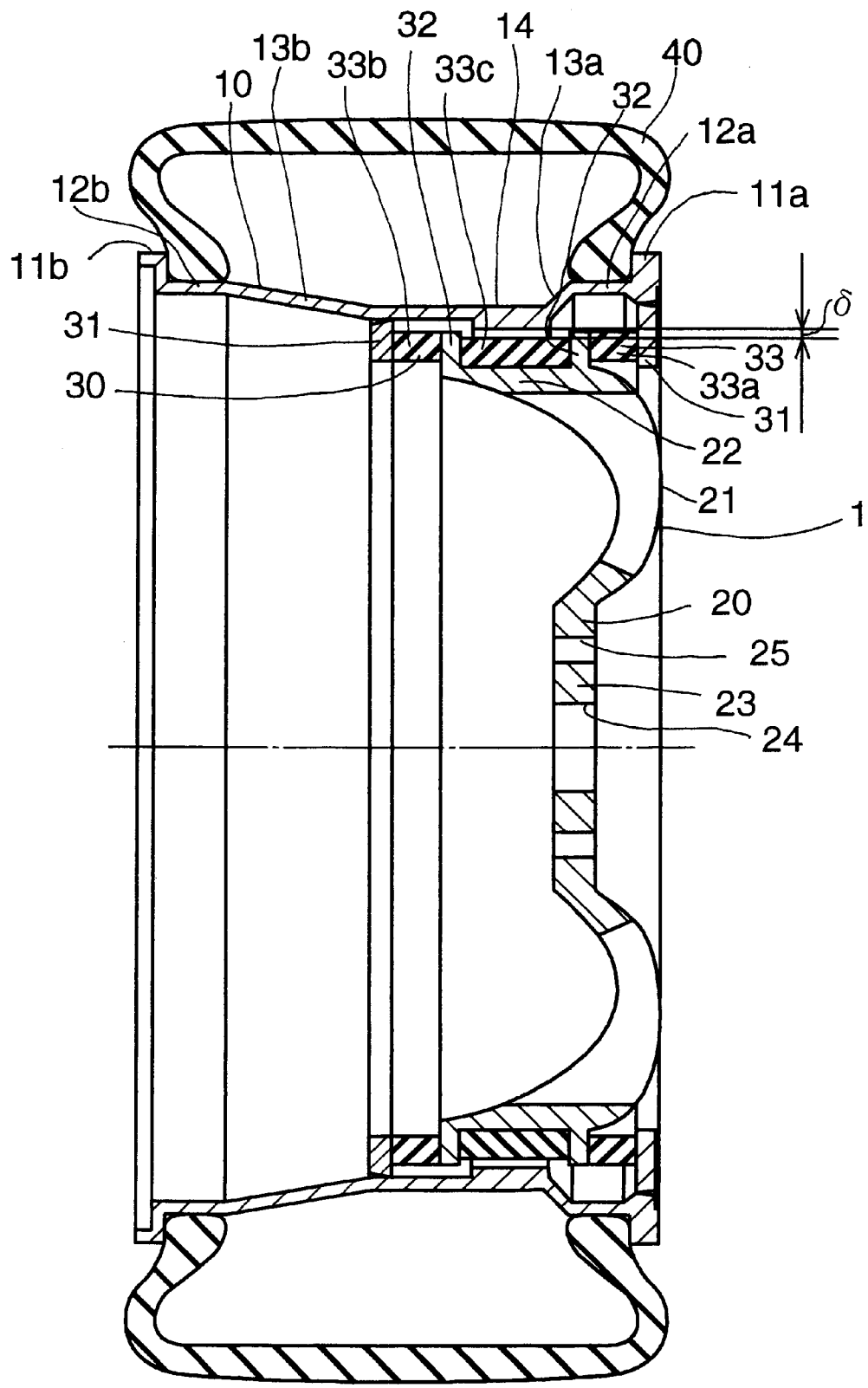
FIG. 5 is a cross-sectional view of a wheel with a damper for an automobile according to a fifth embodiment of the present invention.

With a wheel having a damper according to a fifth embodiment of the present invention, as illustrated in FIG. 5, the disk 20 is made from cast aluminum or synthetic resin, and the rim 10 is made from cast aluminum.

The disk side member 32 is formed integrally with the disk 20. The rim side member 31 has two sub-members: one sub-member is located radially inside the front side rim flange 11a and is formed integrally with the rim 10, and the other sub-member is located radially inside the drop portion 14 and is welded to the rim 10. The rim side member 31 envelopes the disk side member 32 from outside in the axial direction of the wheel, so that the rim 10 and the disk 20 cannot separate from each other in the axial direction of the wheel. The two first portions 33a and 33b are at the same level in the radial direction of the wheel. The rubber member 33 has the second portion 33c as a stopper. A gap of dimension δ is provided between the second portion 33c and the opposing member (the drop portion 14 of the rim). The rubber member 33 is fixed to the rim side member 31 and the disk side member 32 by vulcanization adhesion.

With a wheel having a damper according to a sixth embodiment of the present invention, as illustrated in FIG. 6, the disk 20 is made from steel or wrought aluminum, and the rim 10 is made from steel or wrought aluminum.

The disk side member 32 has two portions: one portion is integrally formed with the disk side member 32 and the other portion is welded to the disk side member 20 and constitutes the axially extending portion 21 of the disk 20. The rim side member 31 is laser-welded to the rim 10. The rim side members 31 is located radially inside the drop portion 14. The disk side member 32 envelopes the rim side member 31 from outside in the axial direction of the wheel, so that the rim 10 and the disk 20 cannot separate from each other in the axial direction of the wheel. The two first portions 33a and 33b of the rubber member 33 are at the same level in the radial direction of the wheel.

The rubber member 33 has the second portion 33c as a stopper. A gap of dimension δ is provided between the second portion 33c and the opposing member (the disk side member 32). The second portion 33c has a cross section which tapers toward the opposing member, so that when the second portion 33c comes into contact with the opposing member, the stopping force works gradually. The rubber member 33 is fixed to the rim side member 31 and the disk side member 32 by vulcanization adhesion.

Figure 8:
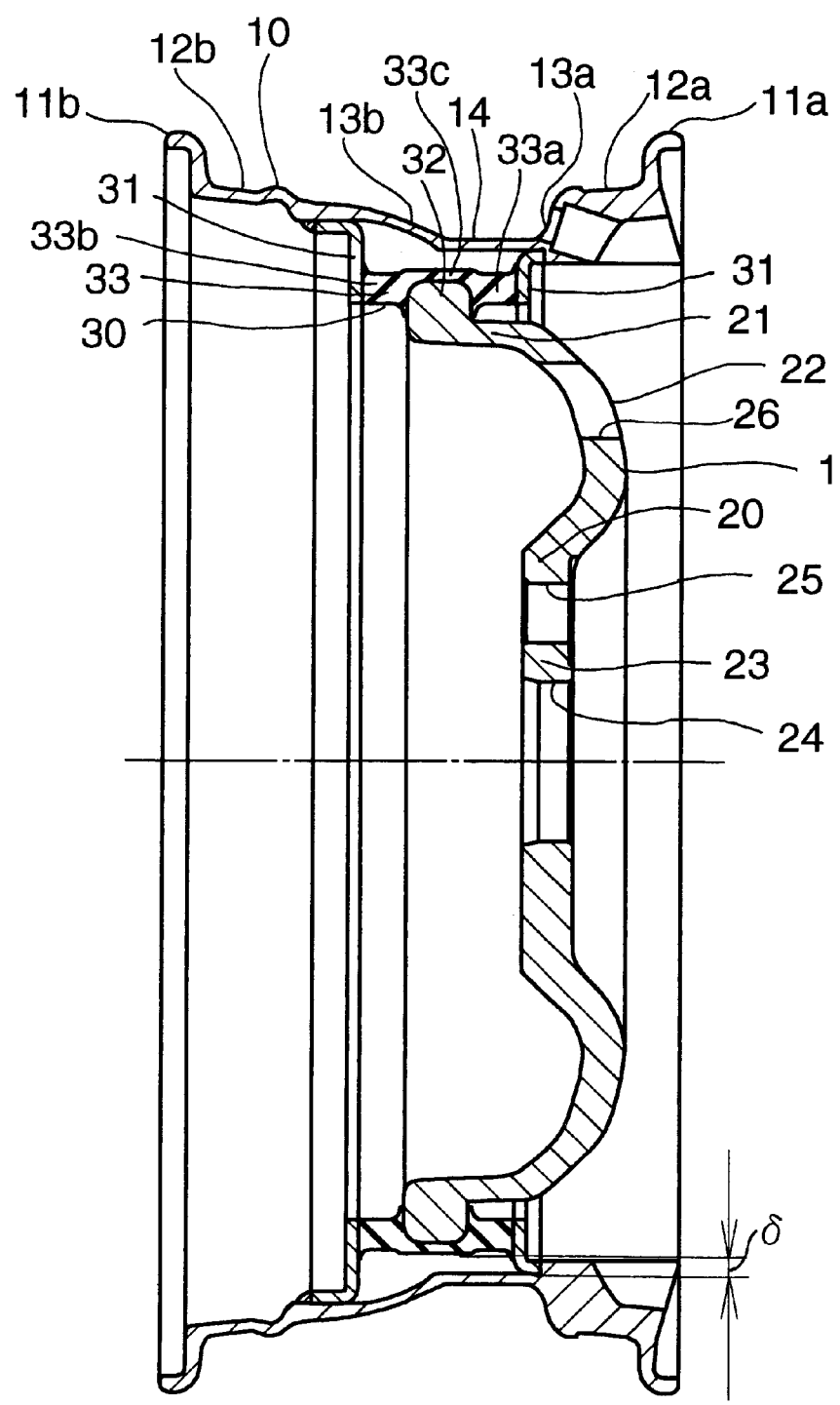
FIG. 8 is a cross-sectional view of the wheel along line 8—8 of FIG. 7.

With a wheel having a damper according to a seventh embodiment of the present invention, as illustrated in FIGS. 7 and 8, the disk 20 is made from cast aluminum or synthetic resin, and the rim 10 is made from cast aluminum.

The disk side member 32 is constructed of a single portion formed integrally with the disk 20. The disk side member 32 protrudes radially outwardly from the radially outer portion of the disk 20 and extends continuously over the entire circumference in the circumferential direction of the wheel. The rim side member 31 includes two sub-members. One of the sub-members of the rim side member 31 is fit to an inside surface of the drop portion 14 of the rim 10 and is pushed against a stepped portion (radially inwardly extending portion) formed at transition portion from the drop portion 14 to the side wall portion 13a of the rim 10 in the axial direction of the wheel without being welded to the rim 10. The reason for non-welding is that the rubber member 33 should be prevented from being affected by a welding heat. The other sub-member of the rim side member 31 has a L-shaped cross section and is welded to a ledge portion (a portion between the side wall portion 13b and the bead seat portion 12b) of the rim 10 at an end of the sub-member apart from the rubber member 33 so that the rubber member 33 is not affected by a welding heat. This weld is conducted after the damper assembly 30 is mounted between the rim 10 and the disk 20. The rim side member 31 envelopes the disk side member 32 from outside in the axial direction of the wheel, so that the rim 10 and the disk 20 cannot separate from each other in the axial direction of the wheel, even when the rubber member 33 breaks. The two first portions 33a and 33b are at the same level in the radial direction of the wheel.

The rubber member 33 is fixed to the rim side member 31 and the disk side member 32 by vulcanization adhesion. The rubber member 33 has the second portion 33c as a stopper. The second portion 33c extends between the two first portions 33a and 33b. The second portion 33c has the outside surface which contacts a space and is not constrained and the inside surface which contacts the outside surface of the disk side member 32. When a large vibrational amplitude occurs and the second portion 33c contacts the opposing member, the second portion 33c acts as a stopper.

Figure 9:
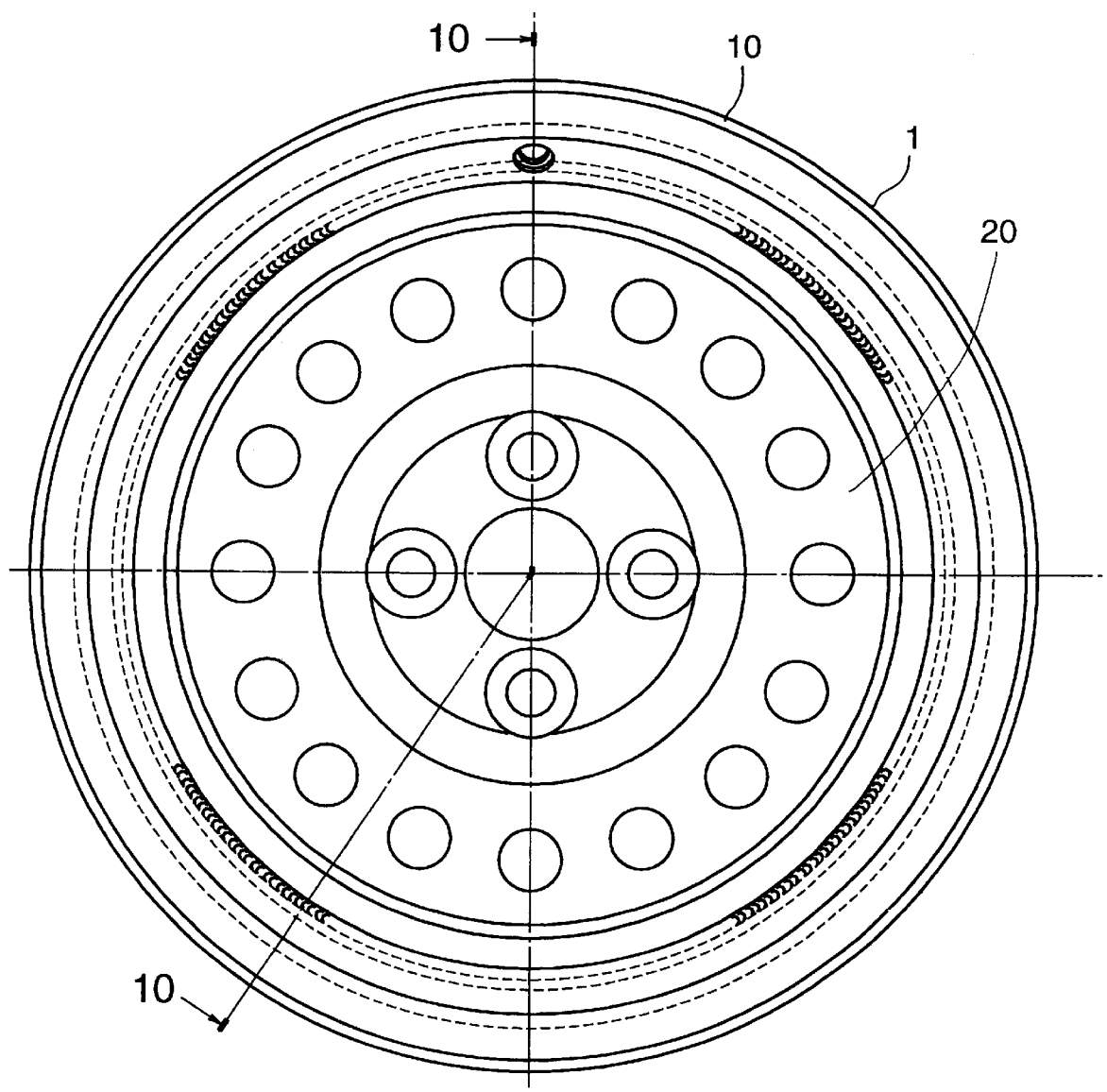
FIG. 9 is a front elevational view of a wheel with a damper for an automobile according to an eighth embodiment of the present invention.
Figure 10:
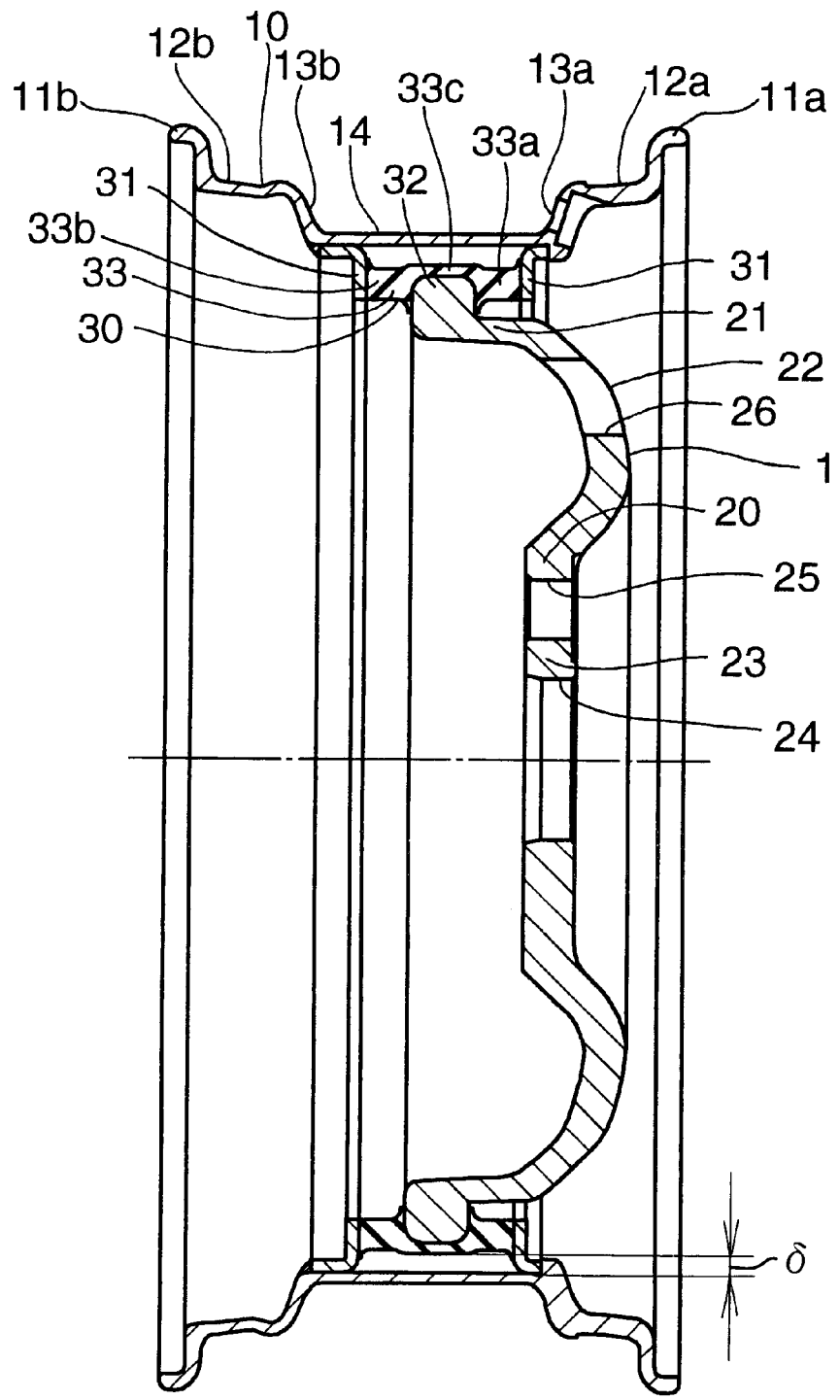
FIG. 10 is a cross-sectional view of the wheel along line 10—10 of FIG. 9.

With a wheel having a damper according to an eighth embodiment of the present invention, as illustrated in FIGS. 9 and 10, the disk 20 is made from cast aluminum or synthetic resin, and the rim 10 is made from cast aluminum.

The disk side member 32 is constructed of a single portion formed integrally with the disk 20. The disk side member 32 protrudes radially outwardly from the radially outer portion of the disk 20 and extends continuously over the entire circumference in the circumferential direction of the wheel. The rim side member 31 includes two sub-members. One of the sub-members of the rim side member 31 is fit to an inside surface of the drop portion 14 of the rim 10 and is pushed against a stepped portion (radially inwardly extending portion), formed at transition portion from the drop portion 14 to the side wall portion 13a of the rim 10 in the axial direction of the wheel, without being welded to the rim 10. The reason for non-welding is that the rubber member 33 should be prevented from being affected by a welding heat. The other sub-member of the rim side member 31 has a L-shaped cross-section and is welded to the inside surface of the drop portion 14 of the rim 10 at an end of the sub-member apart from the rubber member 33 so that the rubber member 33 is not affected by a welding heat. This weld is conducted after the damper assembly 30 is mounted between the rim 10 and the disk 20. The rim side member 31 envelopes the disk side member 32 from outside in the axial direction of the wheel, so that the rim 10 and the disk 20 cannot separate from each other in the axial direction of the wheel, even when the rubber member 33 breaks. The two first portions 33a and 33b are at the same level in the radial direction of the wheel.

The rubber member 33 is fixed to the rim side member 31 and the disk side member 32 by vulcanization adhesion. The rubber member 33 has the second portion 33c as a stopper. The second portion 33c extends between the two first portions 33a and 33b. The second portion 33c has the outside surface which contacts a space and is not constrained and the inside surface which contacts and is fixed by vulcanization adhesion to the outside surface of the disk side member 32. When a large vibrational amplitude occurs and the second portion 33c contacts the opposing member, the second portion 33c acts as a stopper.

Figure 11:
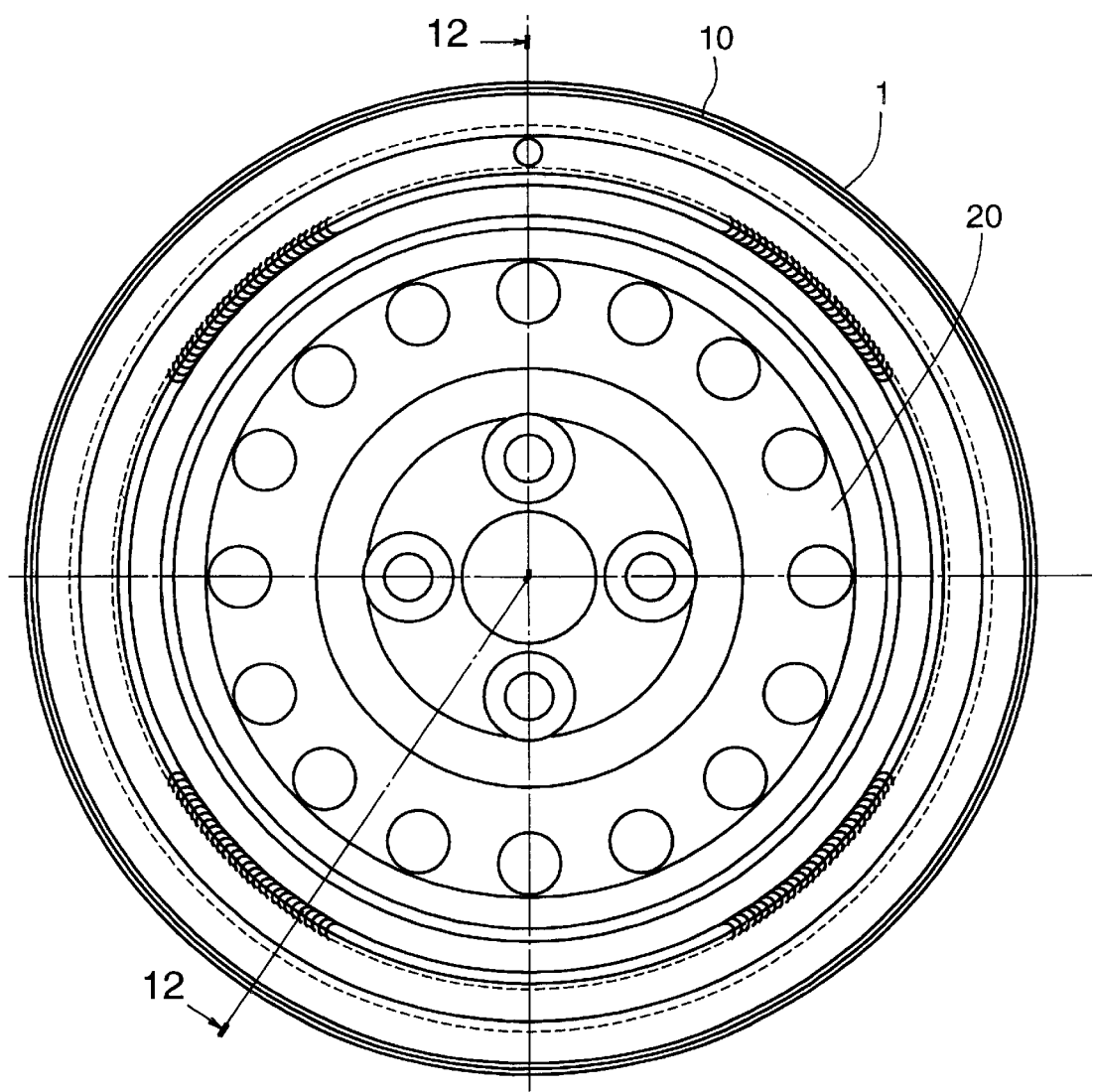
FIG. 11 is a front elevational view of a wheel with a damper for an automobile according to a ninth embodiment of the present invention.
Figure 12:
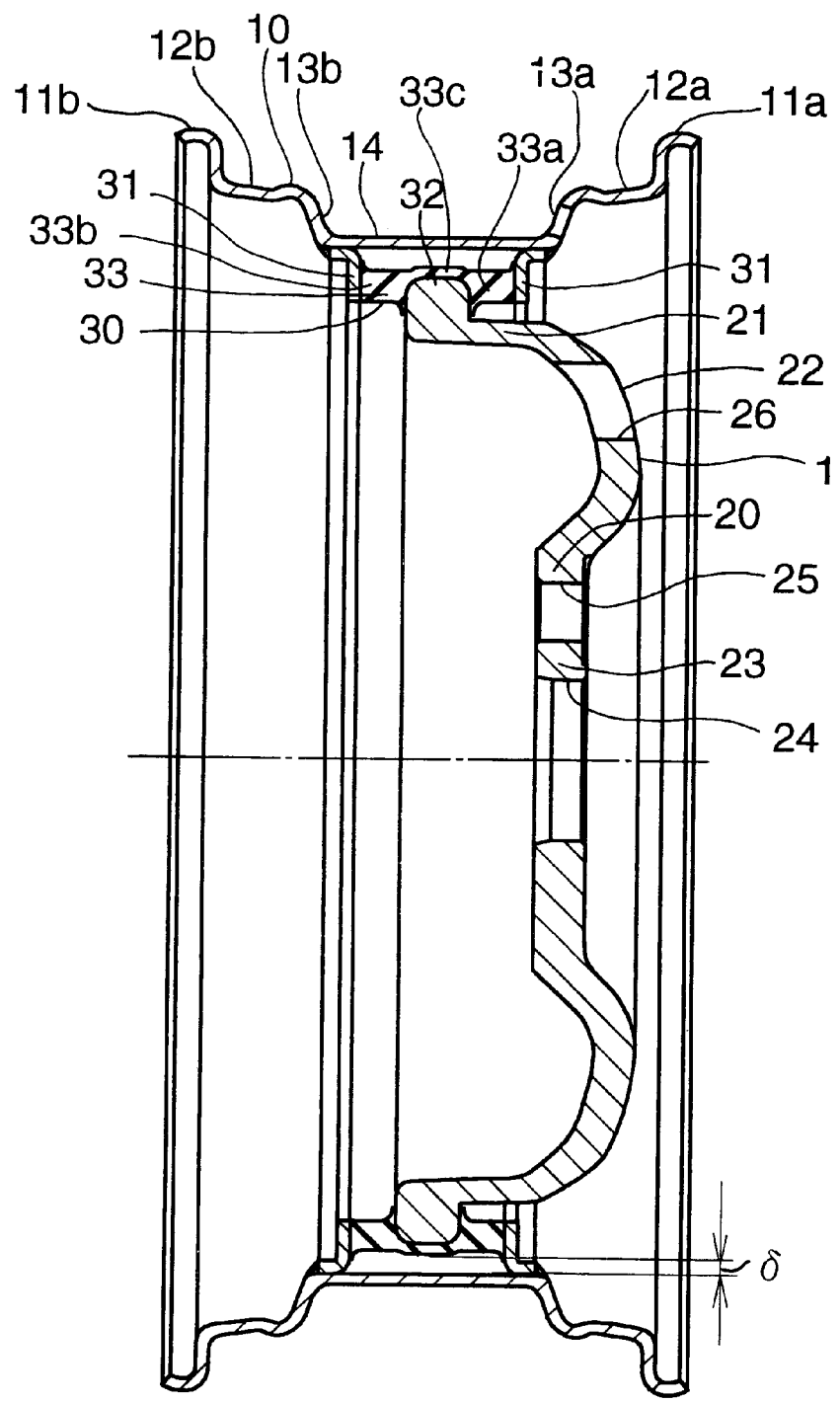
FIG. 12 is a cross-sectional view of the wheel along line 12—12 of FIG. 11.

With a wheel having a damper according to a ninth embodiment of the present invention, as illustrated in FIGS. 11 and 12, the disk 20 is made from cast aluminum or synthetic resin, and the rim 10 is made from steel or wrought aluminum.

The disk side member 32 is constructed of a single portion formed integrally with the disk 20. The disk side member 32 protrudes radially outwardly from the radially outer portion of the disk 20 and extends continuously over the entire circumference in the circumferential direction of the wheel. The rim side member 31 includes two sub-members. One of the sub-members of the rim side member 31 has a L-shaped cross section and is welded to the inside surface of the drop portion 14 of the rim 10 at an end of the sub-member apart from the rubber member 33 so that the rubber member 33 is not affected by a welding heat. The other sub-member of the rim side member 31 has a L-shaped cross-section and is welded to the inside surface of the drop portion 14 of the rim 10 at an end of the sub-member apart from the rubber member 33, so that the rubber member 33 is not affected by a welding heat. The rim side member 31 envelopes the disk side member 32 from outside in the axial direction of the wheel, so that the rim 10 and the disk 20 cannot separate from each other in the axial direction of the wheel, even when the rubber member 33 breads. The two first portions 33a and 33b are at the same level in the radial direction of the wheel.

The rubber member 33 is fixed to the rim side member 31 and the disk side member 32 by vulcanization adhesion. The rubber member 33 has the second portion 33c as a stopper. The second portion 33c extends between the two first portions 33a and 33b. The second portion 33c has the outside surface which contacts a space and is not constrained and the inside surface which contacts and is fixed by vulcanization adhesion to the outside surface of the disk side member 32.

Figure 13:
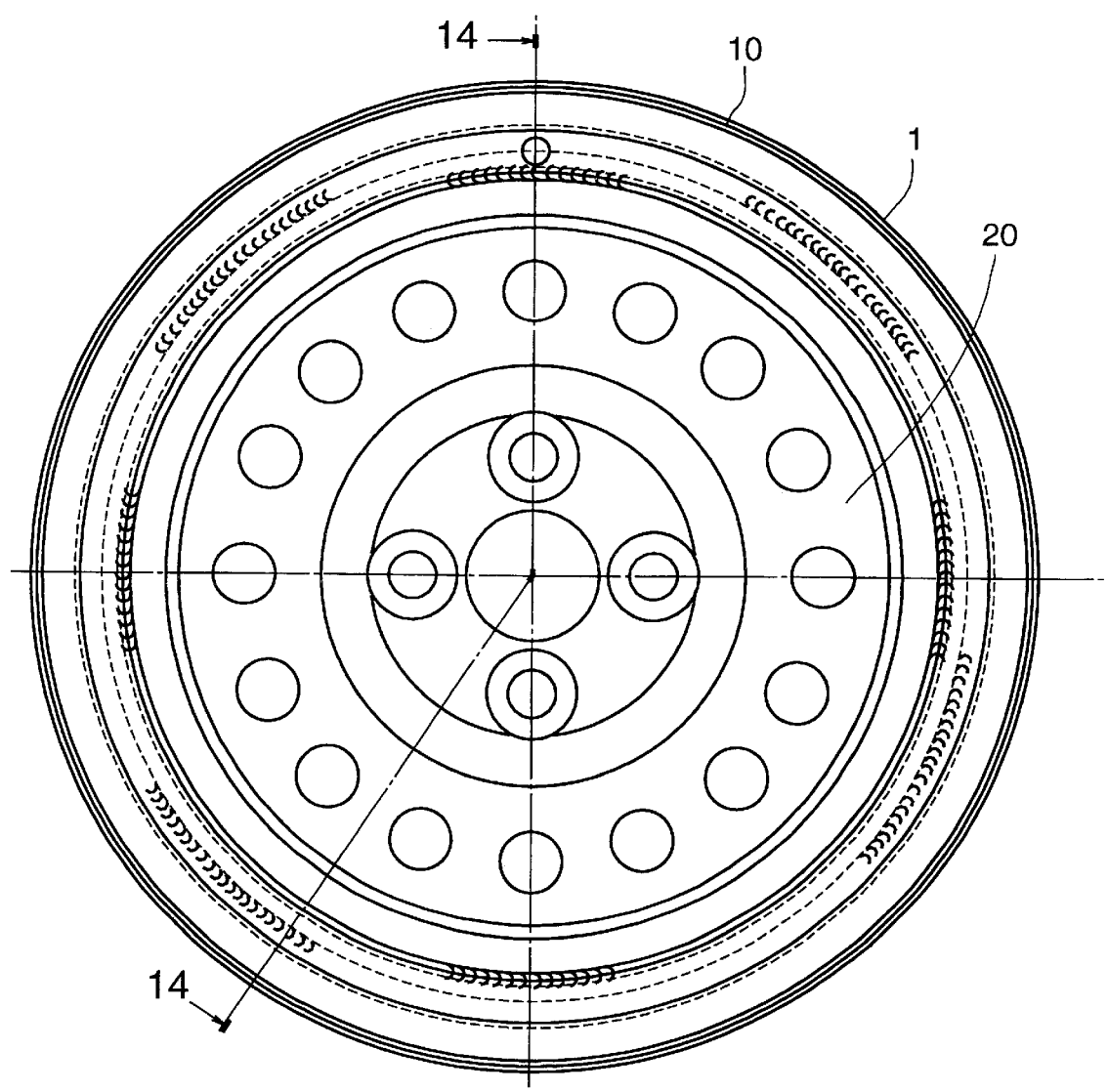
FIG. 13 is a front elevational view of a wheel with a damper for an automobile according to tenth embodiment of the present invention.
Figure 14:
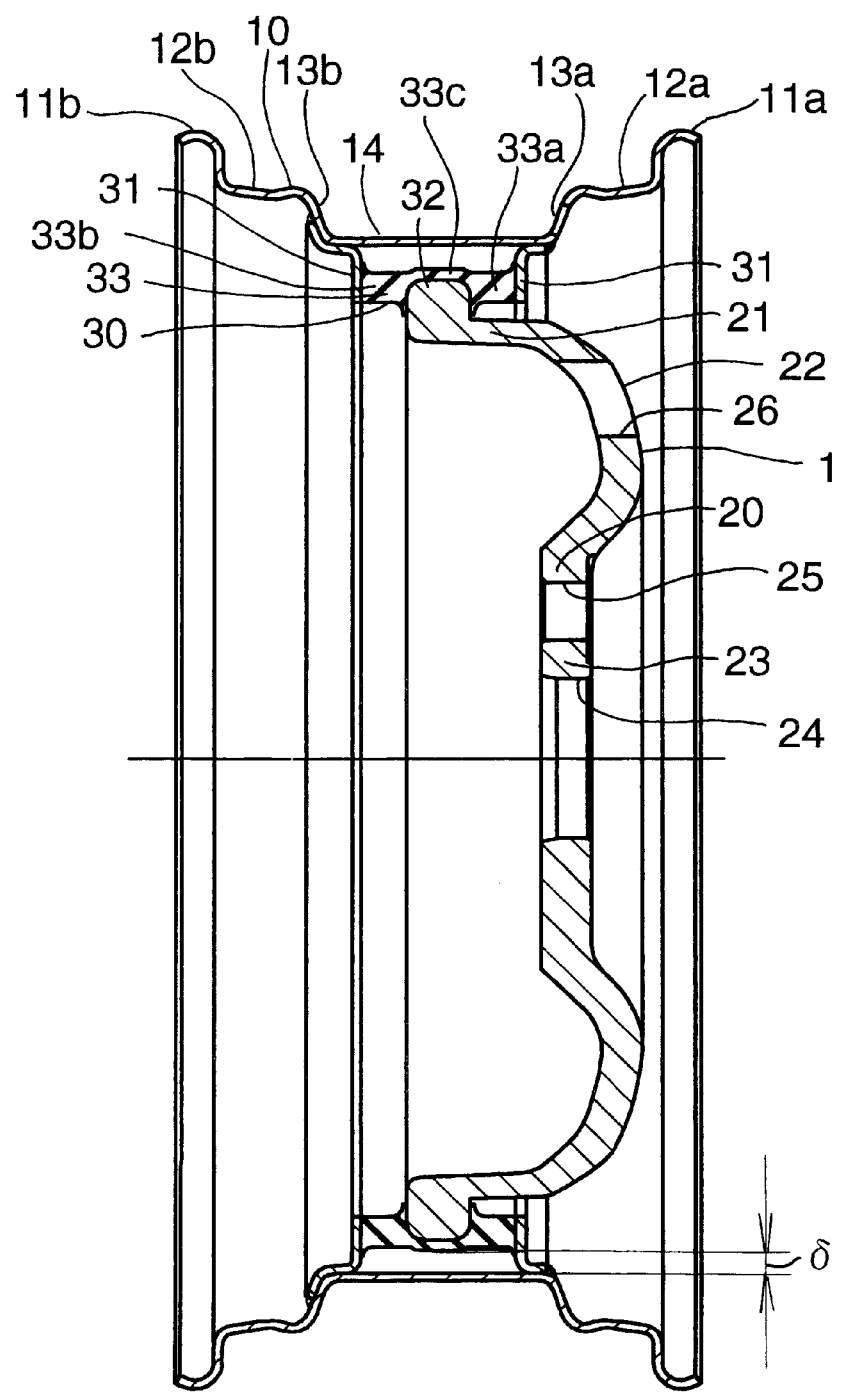
FIG. 14 is a cross-sectional view of the wheel along line 14—14 of FIG. 13.

With a wheel having a damper according to a tenth embodiment of the present invention, as illustrated in FIGS. 13 and 14, the disk 20 is made from cast aluminum or synthetic resin, and the rim 10 is made from steel or wrought aluminum.

The disk side member 32 is constructed of a single portion formed integrally with the disk 20. The disk side member 32 protrudes radially outwardly from the radially outer portion of the disk 20 and extends continuously over the entire circumference in the circumferential direction of the wheel. The rim side member 31 includes two sub-members: a front side sub-member and a back side sub-member. The front side sub-member has a L-shaped cross-section and is welded to the inside surface of the drop portion 14 of the rim 10 at an end of the sub-member apart from the rubber member 33 so that the rubber member 33 is not affected by a welding heat. The back side sub-member has a L-shaped cross-sectional portion located radially inside the drop portion 14 and an obliquely outwardly extending portion extending from the L-shaped cross-sectional portion and located radi- ally inside the side wall portion 13b. The back side sub-member is welded to the inside surface of the rim 10 at an end of the obliquely outwardly extending portion of the back side sub-member apart from the rubber member 33, so that the rubber member 33 is not affected by a welding heat. The rim side member 31 envelopes the disk side member 32 from outside in the axial direction of the wheel, so that the rim 10 and the disk 20 cannot separate from each other in the axial direction of the wheel, even when the rubber member 33 breaks. The two first portions 33a and 33b are at the same level in the radial direction of the wheel.

The rubber member 33 is fixed to the rim side member 31 and the disk side member 32 by vulcanization adhesion. The rubber member 33 has the second portion 33c as a stopper. The second portion 33c extends between the two first portions 33a and 33b. The second portion 33c has the outside surface which contacts a space and is not constrained and the inside surface which contacts and is fixed by vulcanization adhesion to the outside surface of the disk side member 32.

Figure 15:
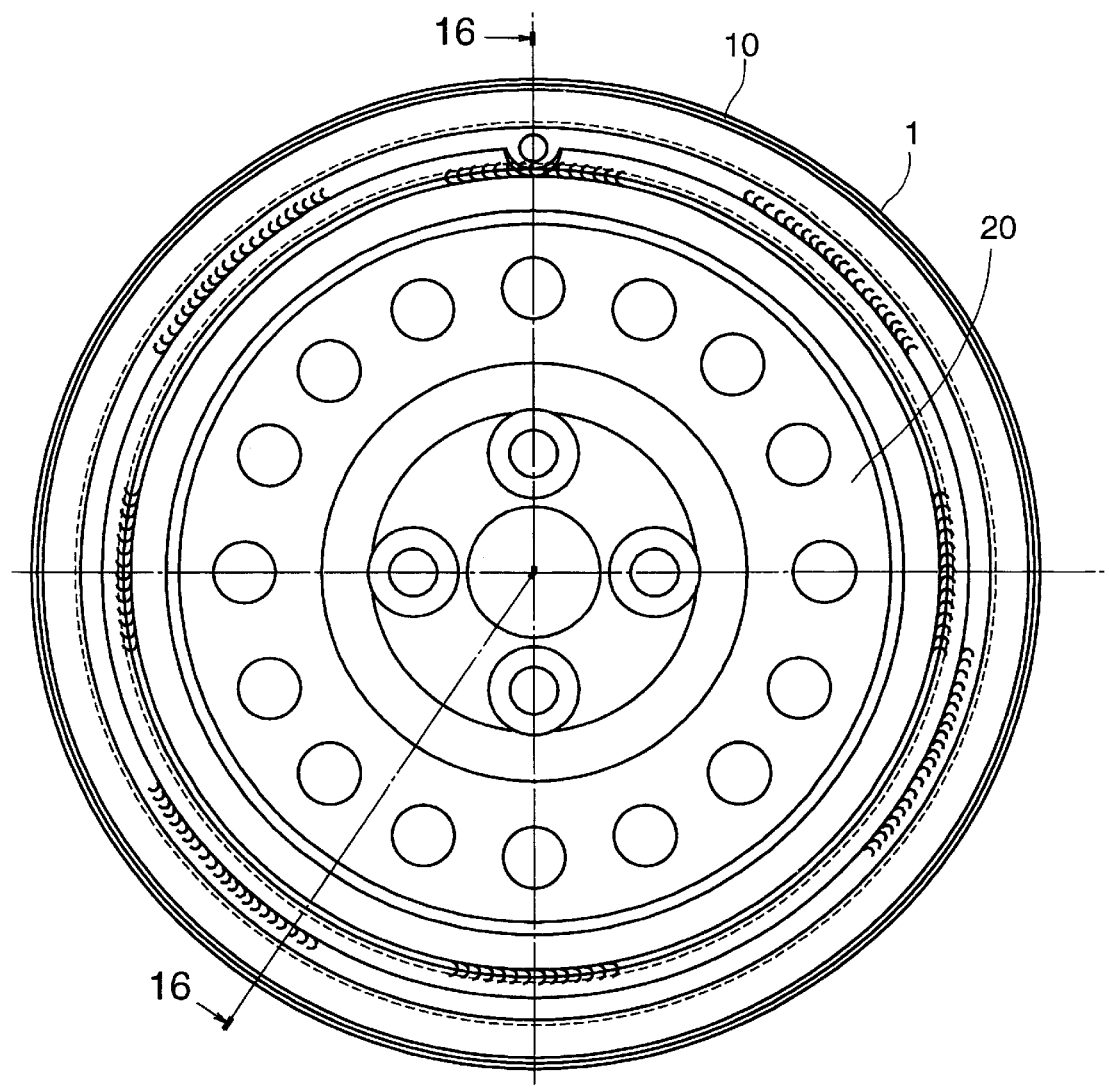
FIG. 15 is a front elevational view of a wheel with a damper for an automobile according to an eleventh embodiment of the present invention.
Figure 16:
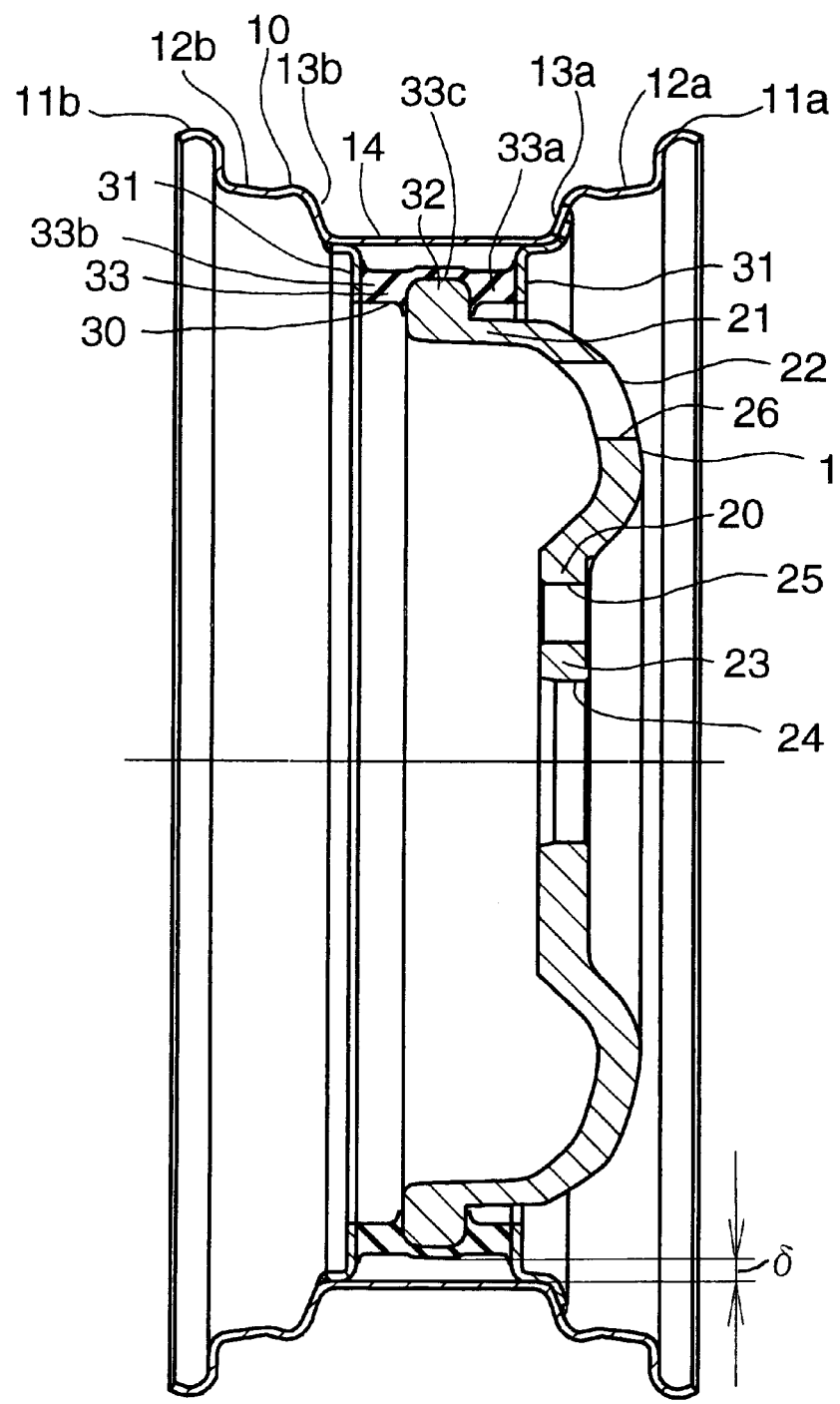
FIG. 16 is a cross-sectional view of the wheel along line 16—16 of FIG. 15.

With a wheel having a damper according to an eleventh embodiment of the present invention, as illustrated in FIGS. 15 and 16, the disk 20 is made from cast aluminum or synthetic resin, and the rim 10 is made from steel or wrought aluminum.

The disk side member 32 is constructed of a single portion formed integrally with the disk 20. The disk side member 32 protrudes radially outwardly from the radially outer portion of the disk 20 and extends continuously over the entire circumference in the circumferential direction of the wheel. The rim side member 31 includes two sub-members: a front side sub-member and a back side sub-member. The front side sub-member has a L-shaped cross-sectional portion located radially inside the drop portion 14 and an obliquely outwardly extending portion located radially inside the side wall portion 13a. The front side sub-member is welded to the inside surface of the rim 10 at an end of the obliquely outwardly extending portion of the front side sub-member apart from the rubber member 33, so that the rubber member 33 is not affected by a welding heat. The back side sub-member has a L-shaped cross section and is welded to the inside surface of the drop portion 14 of the rim 10 at an end of the sub-member apart from the rubber member 33 so that the rubber member 33 is not affected by a welding heat. The rim side member 31 envelopes the disk side member 32 from outside in the axial direction of the wheel, so that the rim 10 and the disk 20 cannot separate from each other in the axial direction of the wheel, even when the rubber member 33 breaks. The two first portions 33a and 33b are at the same level in the radial direction of the wheel.

The rubber member 33 is fixed to the rim side member 31 and the disk side member 32 by vulcanization adhesion. The rubber member 33 has the second portion 33c as a stopper. The second portion 33c extends between the two first portions 33a and 33b. The second portion 33c has the outside surface which contacts a space and is not constrained and the inside surface which contacts and is fixed by vulcanization adhesion to the outside surface of the disk side member 32.

Figure 17:
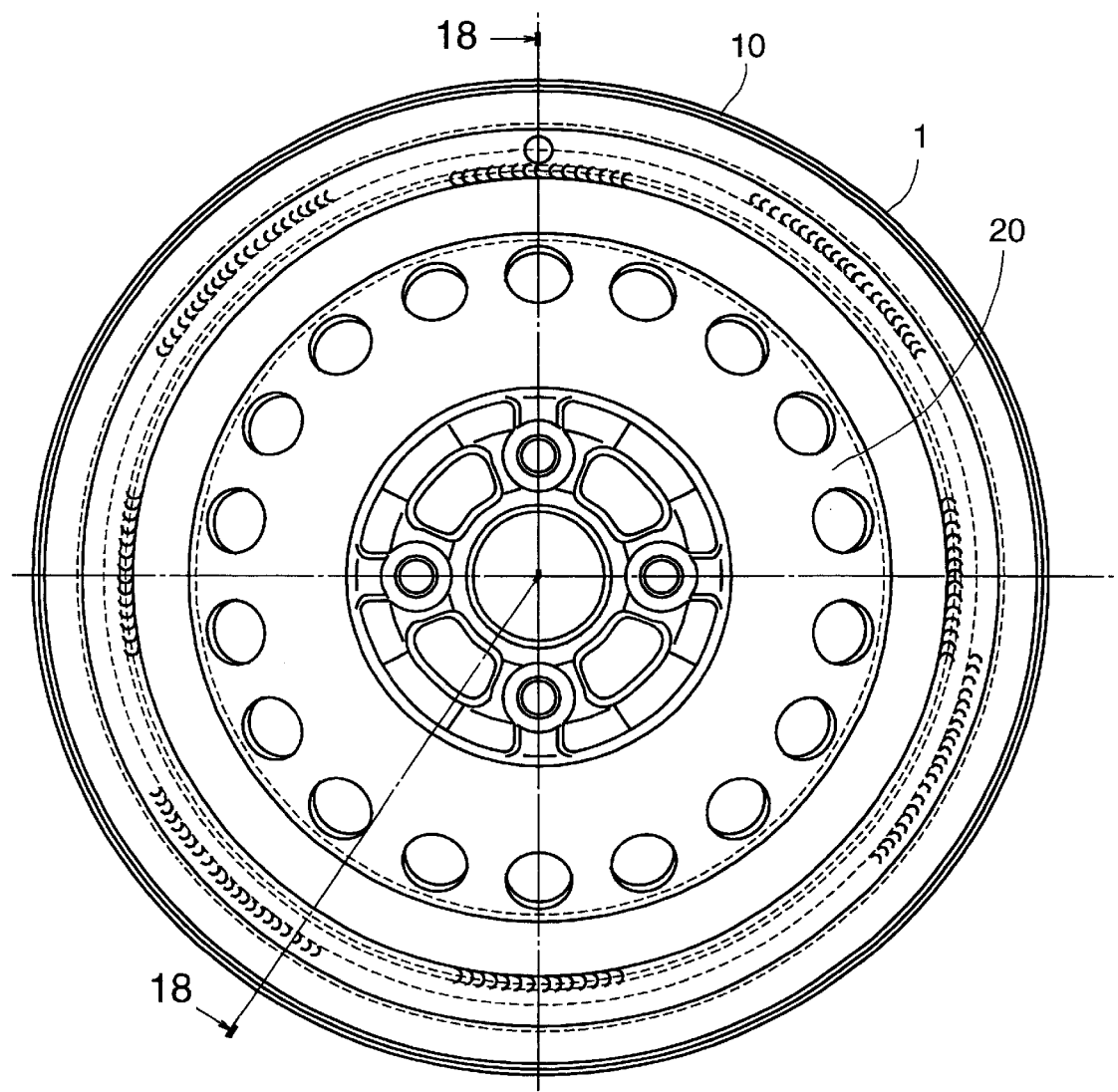
FIG. 17 is a front elevational view of a wheel with a damper for an automobile according to a twelfth embodiment of the present invention.
Figure 18:
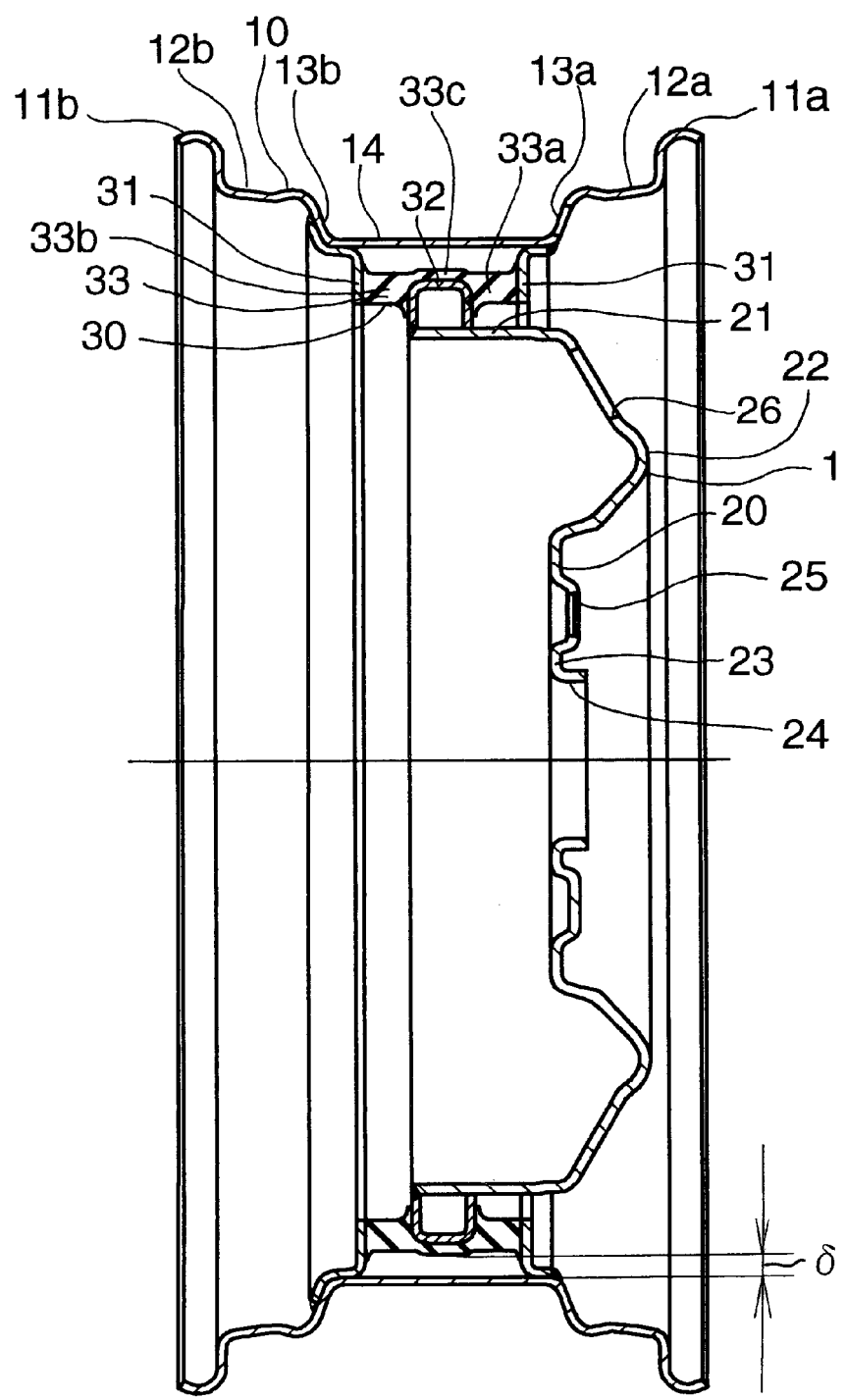
FIG. 18 is a cross-sectional view of the wheel along line 18—18 of FIG. 17.

With a wheel having a damper according to a twelfth embodiment of the present invention, as illustrated in FIGS. 17 and 18, the disk 20 is made from steel or wrought aluminum, and the rim 10 is made from steel or wrought aluminum.

The disk side member 32 is welded to the disk 20. The disk side member 32 is constructed of a protrusion radially outwardly protruding from the radially outer portion of the disk 20 and having a U-or-inverted-U-shaped cross-section. The disk side member 32 extends continuously over the entire circumference in the circumferential direction of the wheel. The rim side member 31 includes two sub-members: a front side sub-member located radially inside the drop portion 14 and a back side sub-member located radially inside the drop portion 14 and the side wall portion 13b of the rim 10. The front side sub-member has a L-shaped cross-section, and is welded to the inside surface of the drop portion 14 of the rim 10 at an end of the sub-member apart from the rubber member 33 so that the rubber member 33 is not affected by a welding heat. The back side sub-member has a L-shaped cross-sectional portion located radially inside the drop portion 14 and an obliquely outwardly extending portion extending from the L-shaped cross-sectional portion and located radially inside the side wall portion 13b. The back side sub-member is welded to the inside surface of the rim 10 at an end of the obliquely outwardly extending portion of the back side sub-member apart from the rubber member 33, so that the rubber member 33 is not affected by a welding heat. The rim side member 31 envelopes the disk side member 32 from outside in the axial direction of the wheel, so that the rim 10 and the disk 20 cannot separate from each other in the axial direction of the wheel, even when the rubber member 33 breaks. The two first portions 33a and 33b are at the same level in the radial direction of the wheel.

The rubber member 33 is fixed to the rim side member 31 and the disk side member 32 by vulcanization adhesion. The rubber member 33 has the second portion 33c as a stopper. The second portion 33c extends between the two first portions 33a and 33b. The second portion 33c has the outside surface which contacts a space and is not constrained and the inside surface which contacts and is fixed by vulcanization adhesion to the outside surface of the disk side member 32.

Figure 19:
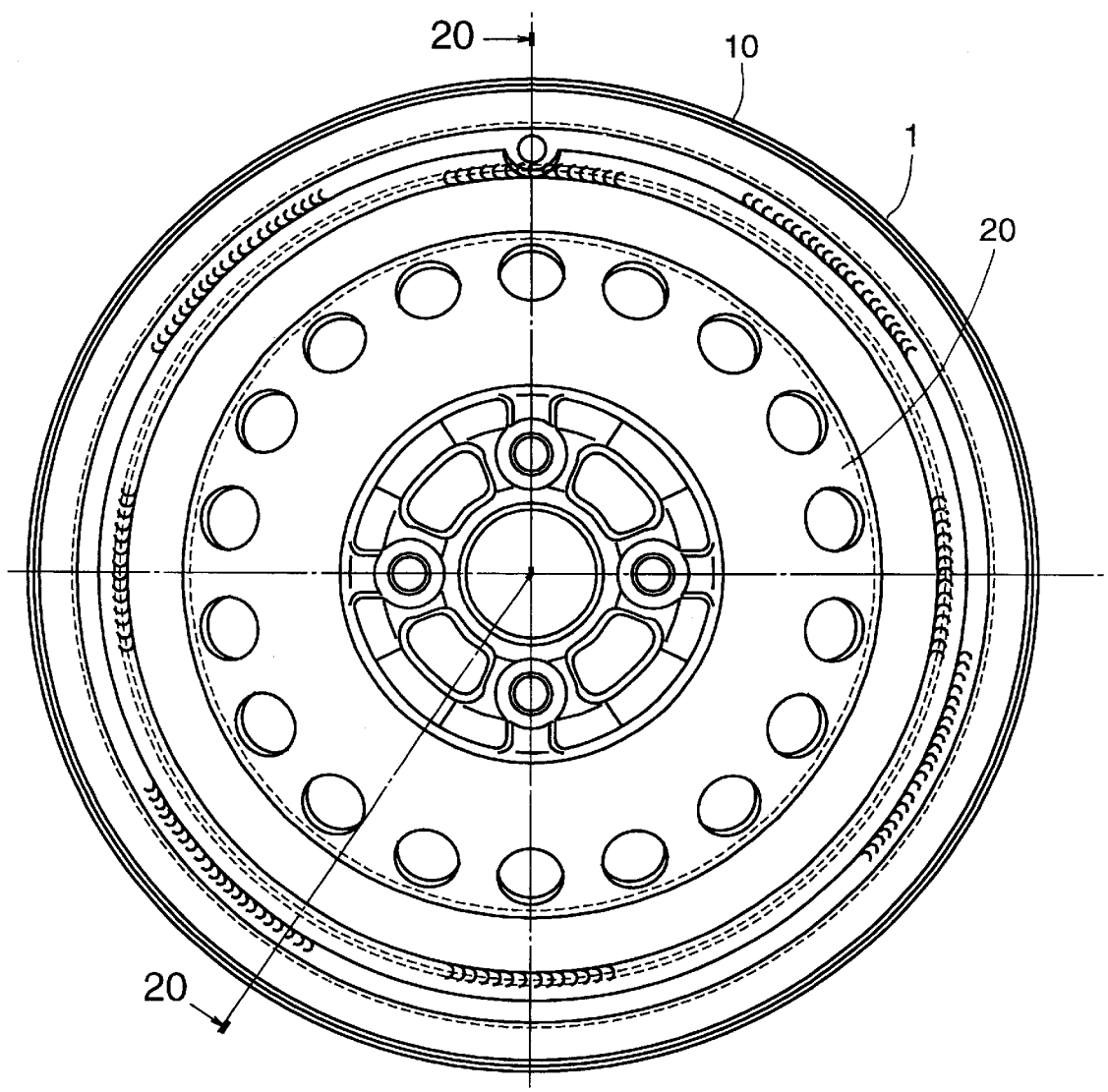
FIG. 19 is a front elevational view of a wheel with a damper for an automobile according to a thirteenth embodiment of the present invention.
Figure 20:
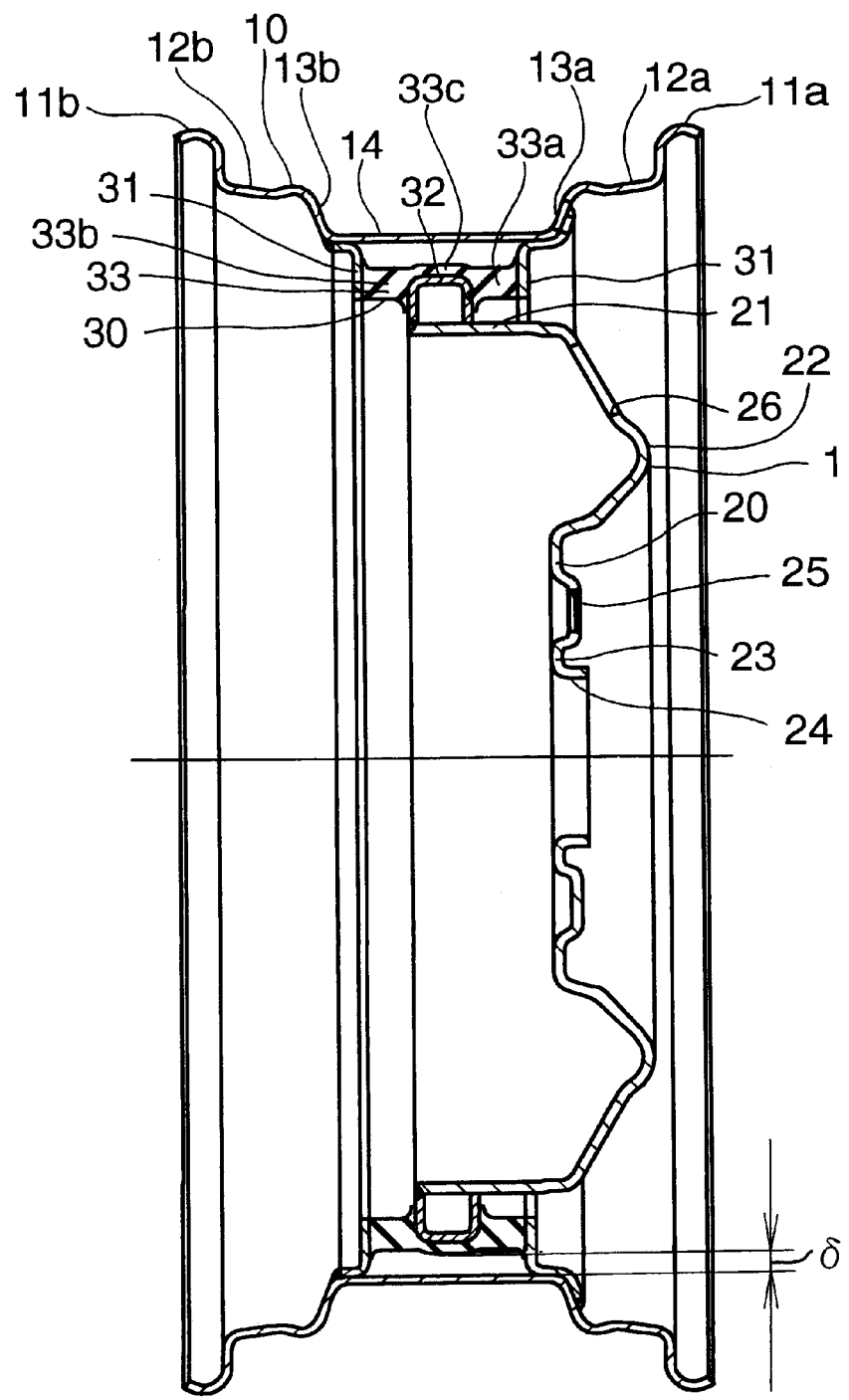
FIG. 20 is a cross-sectional view of the wheel along line 20—20 of FIG. 19.

With a wheel having a damper according to a thirteenth embodiment of the present invention, as illustrated in FIGS. 19 and 20, the disk 20 is made from steel or wrought aluminum, and the rim 10 is made from steel or wrought aluminum.

The disk side member 32 is welded to the disk 20. The disk side member 32 is constructed of a protrusion radially outwardly protruding from the radially outer portion of the disk 20 and having a U-or-inverted-U-shaped cross-section. The disk side member 32 extends continuously over the entire circumference in the circumferential direction of the wheel. The rim side member 31 includes two sub-members: a front side sub-member located radially inside the drop portion 14 and the side wall portion 13a and a back side sub-member located radially inside the drop portion 14. The front side sub-member has a L-shaped cross-sectional portion located radially inside the drop portion 14 and an obliquely outwardly extending portion extending from the L-shaped cross-sectional portion and located radially inside the side wall portion 13a. The front side sub-member is welded to the inside surface of the rim 10 at an end of the obliquely outwardly extending portion of the back side sub-member apart from the rubber member 33 so that the rubber member 33 is not affected by a welding heat. The back side sub-member has a L-shaped cross-section and is welded to the inside surface of the drop portion 14 of the rim 10 at an end of the sub-member apart from the rubber member 33, so that the rubber member 33 is not affected by a welding heat. The rim side member 31 envelopes the disk side member 32 from outside in the axial direction of the wheel, so that the rim 10 and the disk 20 cannot separate from each other in the axial direction of the wheel, even when the rubber member 33 breaks. The two first portions 33a and 33b are at the same level in the radial direction of the wheel.

The rubber member 33 is fixed to the rim side member 31 and the disk side member 32 by vulcanization adhesion. The rubber member 33 has the second portion 33c as a stopper. The second portion 33c extends between the two first portions 33a and 33b. The second portion 33c has the outside surface which is adjacent to a space and is hence unconstrained, and the inside surface which contacts and is fixed by vulcanization adhesion to the outside surface of the disk side member 32.

Figure 21:
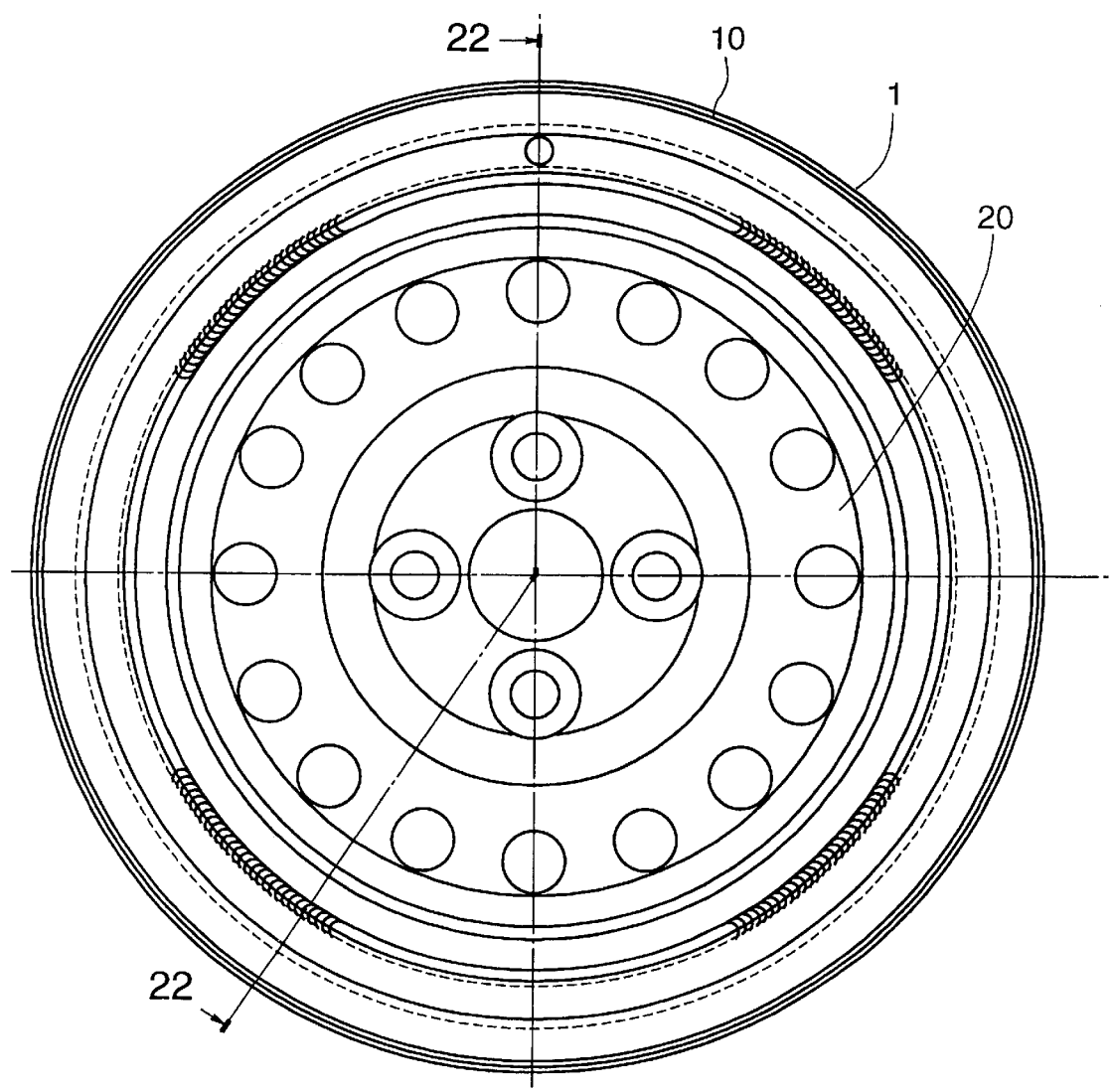
FIG. 21 is a front elevational view of a wheel with a damper for an automobile according to a fourteenth embodiment of the present invention.
Figure 22:
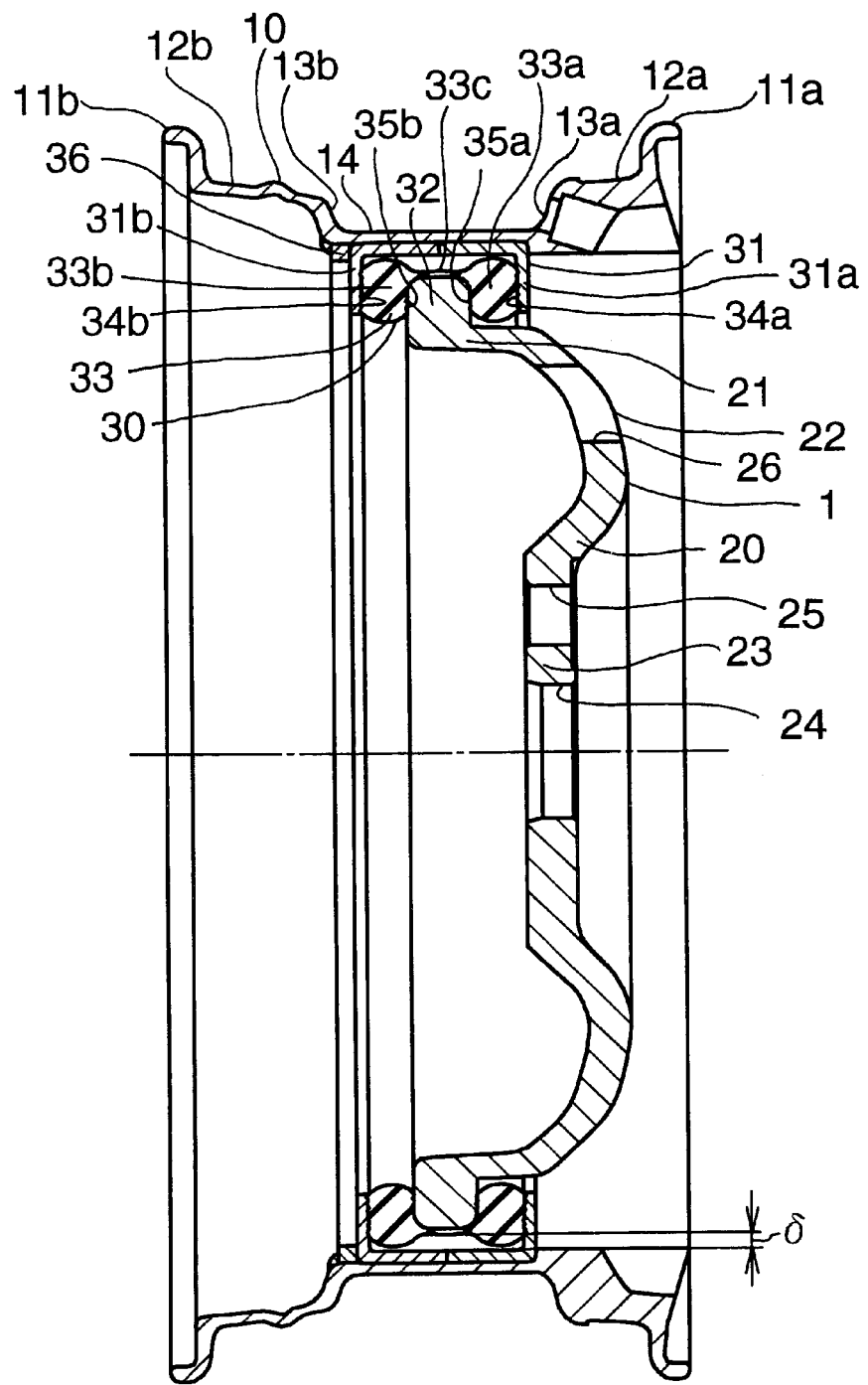
FIG. 22 is a cross-sectional view of the wheel along line 22—22 of FIG. 21.
Figure 23:
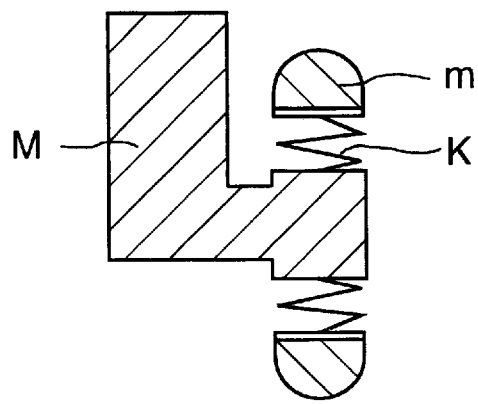
FIG. 23 is a schematic diagram of a vibrational system of an automobile mounted with the wheel and a damper, applicable to any embodiment of the present invention.

With a wheel having a damper according to a fourteenth embodiment of the present invention, as illustrated in FIGS. 21 and 22, the disk 20 is made from cast aluminum or cast synthetic resin, and the rim 10 is made from cast aluminum.

The disk side member 32 is formed integrally with the disk 20 and is constructed of a single protrusion radially outwardly protruding from the radially outer portion of the disk 20. The rim side member 31 includes two sub-members 31a and 31b located radially inside the drop portion 14. The sub-member 31a has a L-shaped cross-section. The sub-member 31a is fit to the inside surface of the drop portion 14 and is pushed against the step portion formed at the transition portion from the drop portion 14 to the side wall portion 13a in the axial direction of the wheel without being welded to the rim 10. The other sub-member 31b has a L-shaped cross-section. The sub-member 31b is fit to the inside surface of the drop portion 14 and then is pushed in the axial direction of the wheel to compress axially the rubber member 33 and finally is fixed to the rim 10 by pushing the sub-member by another piece 36 and welding the piece 36 to the rim 10. The sub-member 36 itself is not welded to the rim 10. The rim side member 31 envelopes the disk side member 32 from outside in the axial direction of the wheel, so that the rim 10 and the disk 20 cannot separate from each other in the axial direction of the wheel, even when the rubber member 33 breaks. The two first portions 33a and 33b are at the same level in the radial direction of the wheel.

The rubber member 33 is fixed to the rim side member 31 and the disk side member 32 by a mechanical fixing. More particularly, the surfaces 34a and 34b of the rim side member 31 where the rim side member 31 contacts the rubber member 33 are knurled, and the surfaces 35a and 35b of the disk side member 32 where the disk side member 32 contacts the rubber member 33 are knurled. Then, the rubber member 33 is disposed between the rim side member 31 and the disk side member 32 and a compression force to them in the axial direction of the wheel so that the rubber member 33 engages the knurled surfaces 34a and 34b, and 35a and 35b, whereby the rubber member 33 is mechanically fixed by friction to the rim side member 31 and the disk side member 32 in the vertical direction and the circumferential direction of the wheel. Due to this mechanical fixing, the vulcanization adhesion is eliminated. After assembly, the first portions 33a and 33b of the rubber member 33 is radially bulged due to the axial compression, but before assembly, the inside and outside surfaces of the first portions 33a and 33b are straight. The inside and outside surfaces of the first portions 33a and 33b are not constrained even after assembly.

The rubber member 33 has the second portion 33c as a stopper. The second portion 33c extends between the two first portions 33a and 33b. The second portion 33c has the outside surface which is adjacent to a space and is hence unconstrained, and the inside surface which contacts the outside surface of the disk side member 32 without being fixed by vulcanization adhesion.

According to the present invention, the following technical advantages are obtained:

First, since the first natural frequency of the vibrational system comprising a spring of the rubber member 33 and a mass of the automobile is in the range of approximately 6–12 Hz, vibration in a range slightly higher than the first natural frequency is damped so that the bumpy feeling is suppressed and the ride quality is improved. When the resonance point of the vibrational system is set at slightly below 10 Hz, the bumpy feeling in the range of approximately 10–30 Hz can be absorbed and damped.

Further, since the damper 30 has a soft structure, the tire can incline accompanied by a deflection of the damper 30. As a result, the camber thrust force is large, and falling of the wheel into the road wheel track is prevented. Further, when a camber angle is generated to the wheel due to rolling of the automobile, the rim inclines to be along the road, so that the road contact pressure of the tire is uniform and the road gripping characteristic of the tire is improved. As a result, controllability during a turn becomes stable. Further, due to the soft structure of the damper 30, there is a time lag in steering, so that a sudden ability to steer the automobile is modified and controllability is improved.

Further, due to the soft structure of the damper 30, the tire-mounted wheel has a self-aligning function, namely, a function to select a center of rotation by itself and to rotate. As a result, it becomes unnecessary to mount a balance weight for compensating an imbalance of the tire-mounted wheel to the tire-mounted wheel and thus balancing work becomes unnecessary.

Second, in the case where the first natural frequency of a vibrational system comprising a spring of the rubber member 33 and a mass of the rim 10 (including the rim side member 31) is in the range of approximately 50–200 Hz, vibration in a range slightly higher than the first natural frequency is damped so that the vibration transmissibility in the range of approximately 150–500 Hz is suppressed and the road noise is decreased.

Third, since the rubber member is designed to act in a shear deflection, the first portion 33a, 33b of the rubber 33 can act as a soft spring having a low spring constant, and the first natural frequency of the vibrational system comprising a spring of the rubber member and a mass of the automobile can be easily tuned in the range of 6–12 Hz.

Fourth, in the case where the second portion (stopper rubber member) 33c is provided, even if the first portion 33a, 33b of the rubber member 33 breaks, the automobile can continue to operate for some distance due to the torque transmittance between the stopper rubber member 33c and the opposing member.

Fifth, in the case where a smallest diameter of the rim side member 31 is smaller than a largest diameter of the disk side member 32, the rim side member 31 and the disk side member 32 are prevented from separating from each other in the axial direction of the wheel, even when the rubber member 33 breaks. Therefore, a kind of a fail-safe design is achieved.

Sixth, since the rim and the disk are integrally cast and then the cast is cut into the rim 10 and disk 20, the productivity is improved compared to the case where the rim and the disk are cast separately.

Although the present invention has been described with reference to specific exemplary embodiments. It will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A wheel with a damper for an automobile comprising:
   a rim;
   a disk radially spaced from said rim; and
   a damper disposed between said rim and said disk, said damper having a rubber member having a spring constant,
   wherein said spring constant of said rubber member of said damper is determined such that a first natural frequency of a vibrational system comprising a spring of said rubber member and a mass of said automobile is in a range of approximately 6–12 Hz; and
   wherein said damper comprises:
   a rim side member immovable relative to said rim; and
   a disk side member immovable relative to said disk, and
   wherein said damper includes a first portion having opposite ends, said first portion being fixed to said rim side member at one of said opposite ends and to said disk side member at the other of said opposite ends, and
   wherein a smallest diameter of said rim side member is smaller than a largest diameter of said disk side member so that said rim side member and said disk side member are impossible to separate from each other in an axial direction of said wheel.

2. A wheel with a damper according to claim 1, wherein said spring constant of said rubber member is selected such that said first natural frequency of said vibrational system is in a range of approximately 8–10 Hz.

3. A wheel with a damper according to claim 1, wherein a spring constant of said rubber member is determined such that a first natural frequency of a vibrational system comprising a spring of said rubber member and a mass of said rim positioned radially outside of said rubber member is in a range of approximately 50–200 Hz.

4. A wheel with a damper according to claim 3, wherein said spring constant of said rubber member is selected such that said first natural frequency of said vibrational system comprising a spring of said rubber member and a mass of said rim is in a range of approximately 70–150 Hz.

5. A wheel with a damper according to claim 1, wherein said rim is a rim for mounting a low-profile tire or a highly pressurized tire thereon.

6. A wheel with a damper according to claim 1, wherein said rubber member of said damper includes a first portion which causes mainly an elastic shear deflection to act as a spring when said rim and said disk are relatively displaced from each other in a vertical direction.

7. A wheel with a damper according to claim 1, wherein said rubber member of said damper includes a second portion which is brought into contact with an opposing member to act as a stopper when said rim and said disk cause a greater relative displacement to each other in a vertical direction than a gap between said second portion and said opposing member.

8. A wheel with a damper according to claim 6, wherein said first portion of said rubber member includes a first end surface where said first portion is fixed to a rim side member fixed to said rim, and a second end surface where said first portion is fixed to a disk side member fixed to said disk, such that said first end surface and said second end surface of said first portion of said rubber member extend substantially perpendicularly to an axis of said wheel.

9. A wheel with a damper according to claim 6, wherein said first portion of said rubber member includes an inside surface and an outside surface which contact a space defined within said wheel so that movement of said surfaces is unconstrained.

10. A wheel with a damper according to claim 6, wherein said first portion of said damper extends in an axial direction of said wheel when no load acts on said damper.

11. A wheel with a damper according to claim 6, wherein said rubber member is constructed of rubber, a laminate of rubber plates and metal plates, or metal-wire-embedded rubber.

12. A wheel with a damper according to claim 6, wherein said first portion of said rubber member is fixed to a rim side member fixed to said rim and to a disk side member fixed to said disk by vulcanization adhesion.

13. A wheel with a damper according to claim 6, wherein said first portion of said rubber member is fixed to a rim side member fixed to said rim and to disk side member fixed to said disk by mechanical fixing, wherein a surface of said rim or said rim side member for fixing said rubber member is knurled, and a surface of said disk or said disk side member for fixing said rubber member is knurled, said rubber member being pressed in an axial direction of said wheel against said knurled surfaces to engage the knurled surfaces.

14. A wheel with a damper for an automobile comprising:
a rim;
a disk radially spaced from said rim; and
a damper disposed between said rim and said disk, said damper having a rubber member having a spring constant,
wherein said spring constant of said rubber member of said damper is determined such that a first natural frequency of a vibrational system comprising a spring of said rubber member and a mass of said automobile is in a range of approximately 6–12 Hz; and
wherein said rubber member of said damper includes a second portion which is brought into contact with an opposing member to act as a stopper when said rim and said disk cause a greater relative displacement to each other in a vertical direction than a gap between said second portion and said opposing member, and
wherein a space is provided between said second portion of said rubber member of said damper and an opposing member which said second portion opposes, a size of said space in a radial direction of said wheel is selected to be 2d+α, where d is a deflection of said damper when a gravitational force of said automobile acts on said damper, and α is a value in a range of approximately 0–1 mm.

15. A wheel with a damper according to claim 7, wherein said second portion of said rubber member is fixed by vulcanization adhesion to either one of a rim side member fixed to said rim and a disk side member fixed to said disk.

16. A wheel with a damper for an automobile comprising:
a rim;
a disk radially spaced from said rim; and
a damper disposed between said rim and said disk, said damper having a rubber member having a spring constant,
wherein said spring constant of said rubber member of said damper is determined such that a first natural frequency of a vibrational system comprising a spring of said rubber member and a mass of said automobile is in a range of approximately 6–12 Hz; and
wherein said damper comprises:
a rim side member immovable relative to said rim; and
a disk side member immovable relative to said disk, and
wherein said damper includes a first portion having opposite ends, said first portion being fixed to said rim side member at one of said opposite ends and to said disk side member at the other of said opposite ends, and
wherein a smallest diameter of said rim side member is smaller than a largest diameter of said disk side member so that said rim side member and said disk side member are impossible to separate from each other in an axial direction of said wheel; and
wherein said rim side member includes two sub-members, one sub-member of said two sub-members being pressed against said rim without being welded to said rim, the other sub-member of said two sub-members is welded to said rim.

17. A wheel with a damper according to claim 1, wherein said rim is made from steel, wrought aluminum, cast aluminum, synthetic resin, or fiber reinforced polymer.

18. A wheel with a damper according to claim 1, wherein said disk is made from steel, wrought aluminum, cast aluminum, synthetic resin, or fiber reinforced polymer.

19. A method for manufacturing a wheel with a damper for an automobile, wherein said wheel with said damper includes:
a rim;
a disk radially spaced from said rim; and
a damper disposed between said rim and said disk, said damper having a rubber member having a spring constant,
wherein said spring constant of said rubber member of said damper is determined such that a first natural frequency of a vibrational system including a spring of said rubber member and a mass of said automobile is in a range of approximately 6–12 Hz,
said method comprising:
casting a rim and disk integral product;
cutting said product into two parts to obtain said rim and said disk; and
mounting said damper between said rim and said disk to obtain said wheel with said damper.

* * * * *